United States Patent
Kanda et al.

(10) Patent No.: US 11,188,044 B2
(45) Date of Patent: Nov. 30, 2021

(54) OPTIMIZATION DEVICE AND CONTROL METHOD OF OPTIMIZATION DEVICE

(71) Applicant: FUJITSU LIMITED, Kawasaki (JP)

(72) Inventors: Kouichi Kanda, Chofu (JP); Hirotaka Tamura, Yokohama (JP); Hidetoshi Matsumura, Toronto (CA)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/654,585

(22) Filed: Oct. 16, 2019

(65) Prior Publication Data

US 2020/0125047 A1    Apr. 23, 2020

(30) Foreign Application Priority Data

Oct. 19, 2018   (JP) .............................. JP2018-197199

(51) Int. Cl.
    *G06F 30/30*      (2020.01)
    *G05B 17/02*      (2006.01)

(52) U.S. Cl.
    CPC .................................. *G05B 17/02* (2013.01)

(58) Field of Classification Search
    CPC ........ G06N 10/00; G06N 5/003; G06N 20/10; G06N 3/04; G06F 15/76; G06F 15/80;

(Continued)

(56) References Cited

U.S. PATENT DOCUMENTS

2006/0225165 A1*   10/2006   Maassen van den Brink ............. G06F 15/76
                                                        257/9
2007/0080341 A1*   4/2007   Macready ............. H04L 9/0852
                                                        257/31

(Continued)

FOREIGN PATENT DOCUMENTS

JP         2018-41351       3/2018
WO      2017/056366 A1   4/2017

(Continued)

OTHER PUBLICATIONS

Tsukamoto et al. "An Accelerator Architecture for Combinatorial Optimization Problems" Sep. 2017, Fujitsu Tech. vol. 53 pp. 8-13. (Year: 2017).*

(Continued)

*Primary Examiner* — Binh C Tat
(74) *Attorney, Agent, or Firm* — Fujitsu Patent Center

(57) ABSTRACT

An optimization device includes a plurality of calculation circuits; a selection circuit; an identification information calculation circuit, and an updating circuit. Each of the plurality of calculation circuits calculates, for a plurality of bits corresponding to a plurality of spins included in an Ising model obtained by converting a problem to be calculated, a first energy change of the Ising model due to a value of a first bit having the value of 1 being changed from 1 to 0 and a value of a second bit having the value of 0 being changed from 0 to 1. The selection circuit outputs first bit identification information identifying one second bit having a value permitted to be updated from 0 to 1, based on a magnitude relationship between thermal excitation energy and the first energy change output by each of the plurality of calculation circuits.

9 Claims, 20 Drawing Sheets

(58) Field of Classification Search
CPC ........ G06F 15/173; G06F 17/16; G06F 17/18;
G06F 1/06; G06F 2015/768; G06F 7/588;
G06F 8/34; G06F 9/4488; G06F 15/16;
G06F 17/11; G06F 2111/06; G06F 30/20;
G06F 7/48; G06F 9/44; H04L 9/0852;
H04L 2209/12; G06K 9/469; G06K 9/38;
H01Q 21/28; B82Y 10/00
USPC .................................................. 716/100–109
See application file for complete search history.

(56) References Cited

U.S. PATENT DOCUMENTS

| | | | |
|---|---|---|---|
| 2018/0075342 A1 | 3/2018 | Tamura et al. | |
| 2018/0218380 A1 | 8/2018 | Fujimaki | |
| 2018/0285787 A1 | 10/2018 | Ito et al. | |
| 2020/0090071 A1* | 3/2020 | Franzke | G06N 10/00 |

FOREIGN PATENT DOCUMENTS

| | | |
|---|---|---|
| WO | 2017/056367 A1 | 4/2017 |
| WO | 2017/056368 A1 | 4/2017 |

OTHER PUBLICATIONS

EESR—Extended European Search Report dated Mar. 12, 2020, from corresponding to European Patent Application No. 19202788.6.

Sanroku Tsukamoto et al.,"An Accelerator Architecture for Combinatorial Optimization Problems", Fujitsu Scientific & Technical Journal (FSTJ), vol. 53, No. 5, Sep. 1, 2017 (Sep. 1, 2017), pp. 8-13, XP055673462. [Cited in EESR filed herewith].

H. Zhu et al.,"A Parallel Algorithm of Boltzmann machine with Rejectionless Method", 6th WSEAS Int. Conf. on Neural Networks, Jun. 16, 2005 (Jun. 16, 2005), pp. 187-191, XP055673739. [Cited in EESR filed herewith].

A. Likas et al.,"A Parallelizable Operation Scheme of the Boltzmann Machine Optimizer Based on Group Updates", Neural, Parallel and Scientific Computations, vol. 3, No. 4, Jun. 1, 1995 (Jun. 1, 1995), pp. 451-465, XP055673766. [Cited in EESR filed herewith].

EPOA—Office Action of European Patent Application No. 19202788.6 dated Nov. 19, 2020.

EPOA—Summons to attend Oral Proceedings dated Sep. 16, 2021, from corresponding European Patent Application No. 19202788.6.

* cited by examiner

FIG. 9

| i | j | DIR(j) |
|---|---|---|
| i > j | | 0 |
| i = j | | 1 |
| i < j | | 2 |

| $g_{j-1}, g_j, g_{j+1}$ | DIR(j) | $CNT_{j-1,j}$ | $CNT_{j,j-1}$ | $CNT_{j+1,j}$ | $CNT_{j,j+1}$ |
|---|---|---|---|---|---|
| $g_{j-1} = g_j = g_{j+1}$ | 0 | 0 | 1 | 1 | 0 |
|  | 1 | 0 | 1 | 0 | 1 |
|  | 2 | 1 | 0 | 0 | 1 |
| $g_{j-1} \neq g_j$ $g_j = g_{j+1}$ | 0 | 0 | | 1 | 0 |
|  | 1 | | | 0 | 1 |
|  | 2 | | | | |
| $g_{j-1} = g_j$ $g_j \neq g_{j+1}$ | 0 | | | | |
|  | 1 | 0 | 1 | 0 | |
|  | 2 | 1 | 0 | | |
| $g_{j-1} \neq g_j \neq g_{j+1}$ | φ | | | | |

OPTIMIZATION DEVICE AND CONTROL METHOD OF OPTIMIZATION DEVICE

CROSS-REFERENCE TO RELATED APPLICATION

This application is based upon and claims the benefit of priority of the prior Japanese Patent Application No. 2018-197199, filed on Oct. 19, 2018, the entire contents of which are incorporated herein by reference.

FIELD

The embodiments discussed herein are related to an optimization device and a control method of the optimization device.

BACKGROUND

As a method of solving a multivariate optimization problem which is not easily handled by a Neumann-type computer, there is an optimization device (at times referred to as Ising machine or Boltzmann machine) using an Ising-type energy function. The optimization device calculates a problem to be calculated by replacing the problem with an Ising model which is a model representing a behavior of a spin of a magnetic body.

The optimization device is also capable of being modeled, for example, using a neural network. In this case, each of a plurality of bits which corresponds to a plurality of spins included in the Ising model functions as a neuron which outputs 0 or 1 in accordance with another bit and a weighted value (also referred to as a coupling factor) indicating a magnitude of interaction between the other bit and the own bit. The optimization device uses, for example, a probabilistic search method, such as simulated annealing, to find a state (a combination of values of respective bits) in which the minimum value among values (hereinafter, referred to as energy) of energy function described above (also referred to as cost function or objective function) is obtained, as a solution.

In the related art, there is an optimization device which calculates a state in which energy is minimized by performing simulated annealing using a digital circuit (for example, see Japanese Laid-open Patent Publication No. 2018-041351). The optimization device in the related art calculates an energy change by changing by a value of only one bit at a time, and determines whether or not permit the change of the bit according to a value obtained by adding a noise value corresponding to temperature to the energy change. A change in the value of the bit with increasing energy is also permitted with a predetermined probability, the lower the temperature and the lower the probability.

Meanwhile, an optimization problem includes a constraint (1-hot constraint) that the number of bits having a value of 1 is only one in each of a plurality of groups each including a plurality of bits. For example, many scheduling problems (such as traveling salesman problems, dispatching problems, and the like), a knapsack problem, a bin packing problem, and the like have 1-hot constraints.

International Publication Pamphlet No. WO 2017/056366, International Publication Pamphlet No. WO 2017/056367, and International Publication Pamphlet No. WO 2017/056368 are examples of related art.

As described above, in the optimization device in the related art, the number of bits to be changed at a time is one. For example, the optimization device in the related art searches for a ground state in which energy becomes minimum by repeating state transition of Hamming distance=1. For this reason, in the optimization device in the related art, transition to a state not satisfying the 1-hot constraint also occurs, and the number of states in which the transition may occur (search space) is larger than the number of states satisfying the 1-hot constraint. The state transition takes time due to an energy barrier generated for a 1-hot constraint term. From the above, in the optimization device in the related art, there is a problem that it takes time to calculate an optimization problem having the 1-hot constraint (search for a ground state).

As one aspect, the present disclosure provides an optimization device and a control method of the optimization device capable of reducing a calculation time of an optimization problem having a 1-hot constraint.

SUMMARY

According to an aspect of the embodiments, an optimization device includes: a plurality of calculation circuits configured to respectively calculate, for a plurality of bits corresponding to a plurality of spins included in an Ising model obtained by converting a problem to be calculated, a first energy change of the Ising model due to a value of a first bit having the value of 1 being changed from 1 to 0 and a value of a second bit having the value of 0 being changed from 0 to 1, among a plurality of bits included in each of a plurality of groups in a case where the plurality of bits are divided into the plurality of groups, based on a first local field value for the first bit, a second local field value for the second bit, and a weighted value, held in a storage, indicating a magnitude of interaction between the first bit and the second bit; a selection circuit configured to output first bit identification information identifying one second bit having a value permitted to be updated from 0 to 1, among the second bits included in each of the plurality of groups, based on a magnitude relationship between thermal excitation energy, determined based on an input temperature parameter and a random number, and the first energy change output by each of the plurality of calculation circuits; an identification information calculation circuit configured to detect a first group to which the second bit permitted to be updated belongs and output second bit identification information identifying the first bit which belongs to the first group, based on the first bit identification information output by the selection circuit; and an updating circuit configured to update a value of the first bit which belongs to the first group from 1 to 0 based on the second bit identification information, and update a value of the second bit permitted to be updated from 0 to 1 based on the first bit identification information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a diagram illustrating an example of a control signal output by a control signal generation unit;

DESCRIPTION OF EMBODIMENTS

Figure 1:
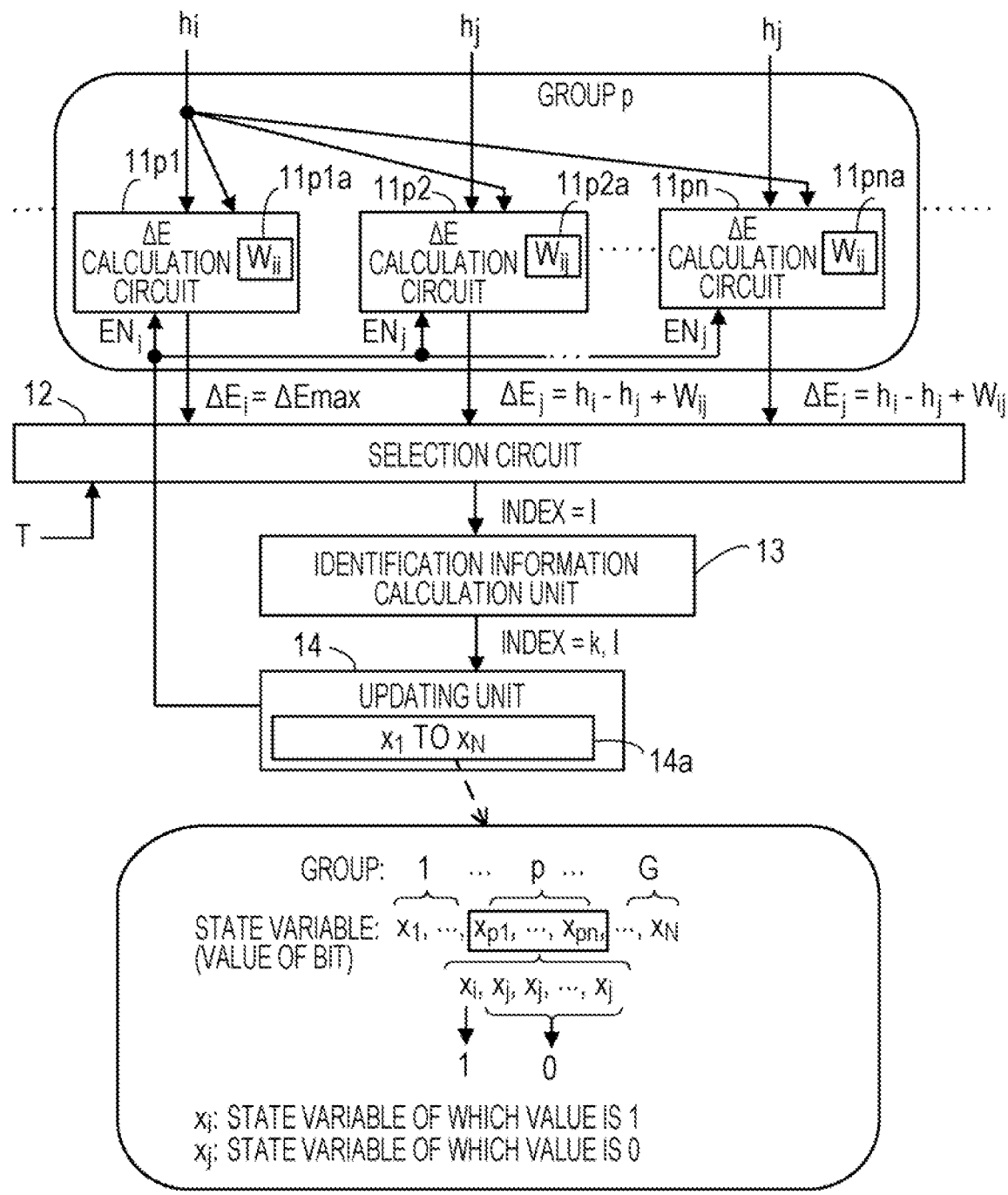
FIG. 1 is a diagram illustrating an example of an optimization device according to a first embodiment.

Hereinafter, embodiments are described with reference to the accompanying drawings.

An optimization device to be described below shortens a calculation time of an optimization problem having a 1-hot constraint by excluding a search of a state other than a state satisfying the 1-hot constraint.

In a case where values of N bits corresponding to a plurality of spins (the number of spins=N) included in an Ising model are represented by $x_1$ to $x_N$ which are state variables, for example, the 1-hot constraint is satisfied when the number of state variables having a value of 1 is only one in a group in each { } in the following equation (1).

$$x = (\{x_1, \ldots, x_{s_1}\}, \{x_{s_1+1}, \ldots x_{s_1}\}, \ldots \{x_{s_{G-1}+1}, \ldots, x_N\}) \quad (1)$$

For example, in a case where three state variables of $x_1$, $x_2$, and $x_3$ are in a certain group, a state of $\{x_1, x_2, x_3\} = \{1, 0, 0\}$, $\{0, 1, 0\}$, $\{0, 0, 1\}$ satisfies the 1-hot constraint. On the other hand, a state of $\{x_1, x_2, x_3\} = \{0, 0, 0\}$, $\{1, 1, 0\}$, $\{1, 0, 1\}$, $\{0, 1, 1\}$ $\{1, 1, 1\}$ does not satisfy the 1-hot constraint. In order to transition from one state satisfying the 1-hot constraint to another state satisfying the 1-hot constraint, the optimization device changes values of 2 bits in one state updating process. For example, the optimization device generates state transition of Hamming distance=2.

The 1-hot constraint may be represented by the following equation (2).

$$\sum_{i=s_{n-1}+1}^{s_n} x_i = 1 \quad (2)$$

where $s_n = \sum_{j=1}^{n} m_j \ (n = 1, 2, \ldots, G, s_0 = 0, s_G = N)$

In the equation (2), G is the number of groups (an integer equal to or more than 2), and $m_j$ is the number of state variables belonging to a group j.

An energy function of the optimization problem in consideration of the 1-hot constraint may be represented as the following equation (3).

$$E(x) = \Sigma Cost(x_i) + \lambda_1 (\Sigma x_1 - 1)^2 + \lambda_2 f_2(x_i) + \ldots - \lambda_{2N} f_2(x_i) \quad (3)$$

In the equation (3), the first item on the right side represents a cost function, the second item represents a 1-hot constraint term in consideration of the 1-hot constraint, and the third and the following items represent a constraint term in consideration of other constraints (there is also a case where the constraint term includes another 1-hot constraint term). A sufficiently large value is used as $\lambda_1$ (a constraint weight) so that energy does not decrease in a case where the 1-hot constraint is not satisfied.

On the other hand, an Ising-type energy function E(x) using a weighted value is defined, for example, by the following equation (4).

$$E(x) = -\sum_{<i,j>} W_{ij} x_i x_j - \sum_i b_i x_i \quad (4)$$

The first term on the right side is an integration of products of values (0 or 1) of two bits and a weighted value without leakage and duplication, for all the combinations of two bits selectable from all bits included in the Ising model. $x_i$ is a state variable representing a value of a bit having index (bit identification information)=i, $x_j$ is a state variable representing a value of a bit having index=j, and $W_{ij}$ is a weighted value indicating a magnitude of interaction of bits having index=i, j. In addition, $W_{ii}=0$. $W_{ij}=W_{ji}$ in many cases (for example, a coefficient matrix by the weighted value is a symmetric matrix in many cases).

The second term on the right side is a sum of products of respective bias values of all the bits and values of the bits. $b_i$ indicates a bias value of a bit of index=i.

In a case where a search is performed also for a state other than the state satisfying the 1-hot constraint, the number of bits for representing $W_{ij}$ in the equation (4) increases as a value of $\lambda_1$ in the equation (3) increases. $\lambda_1$ is determined, for example, in consideration of a balance between N (corresponding to a size of the problem) described above and $W_{ij}$. For example, $W_{ij}$ or $b_i$ is first calculated using $\lambda_1$ of approximately 10 times the maximum value of $W_{ij}$, and energy minimization is performed. When a convergence solution does not satisfy the 1-hot constraint, the value of $\lambda_1$ is increased until the 1-hot constraint is satisfied.

On the other hand, in a case where only the state satisfying the 1-hot constraint is searched, the number of bits for representing W; may be reduced since the second 1-hot constraint term in the right side in the equation (3) may be deleted.

Meanwhile, in the equation (4), when a value of $x_i$ changes to $1-x_i$, an increment of $x_i$ is represented as $\Delta x_i = (1-x_i)-x_i=1-2x_i$. An energy change ($\Delta E_i$) due to the change of the value is represented by the following equation (5).

$$\Delta E_i = E(x)|_{x_i \to 1-x_i} - E(x) = -\Delta x_i \left( \sum_j W_{ij} x_j + b_i \right) = -\Delta x_i h_i \quad (5)$$

In the equation (5), $\Delta x_i$ becomes $-1$ when $x_i$ changes from 1 to 0, and $\Delta x_i$ becomes 1 when $x_i$ changes from 0 to 1. $h_i$ is called a local field value (a local field), and the product of $h_i$ by a sign (+1 or −1) according to $\Delta x_i$ is $\Delta E_i$.

A change in $h_i$ when $x_j$ changes from 0 to 1 is $\Delta h_i^{(j)}=+W_{ij}$, and a change in $h_1$ when $x_j$ changes from 1 to 0 is $\Delta h_i^{(j)}=-W_{ij}$. In the same manner, a change in $h_j$ for a bit of index=j when $x_i$ changes may be represented as $\Delta h_j^{(i)}=\Delta x_i W_{ij}$.

Therefore, an energy change when both of $x_i$ and $x_j$ change may be represented by the following equation (6).

$$\Delta E_{ij} = -\Delta x_i h_i - \Delta x_j (h_j + \Delta x_i W_{ij}) \quad (6)$$
$$= -\Delta x_i h_i - \Delta x_j h_j - \Delta x_i \Delta x_j \Delta W_{ij}$$

As described above, in order to transition from one state satisfying the 1-hot constraint to another state satisfying the 1-hot constraint, values of 2 bits are changed. When an energy change when a value of a bit of index=i changes from 1 to 0 and a value of a bit of index=j changes from 0 to 1 is represented as $\Delta E_j$, $\Delta x_i=-1$ and $\Delta x_j=1$ in the equation (6), so that $\Delta E_j$ may be represented by the following equation (7).

$$\Delta E_j = h_i - h_j + W_{ij} \quad (7)$$

The optimization device to be described below includes a circuit which calculates the energy change represented by the equation (7).

First Embodiment

FIG. 1 is a diagram illustrating an example of an optimization device according to a first embodiment.

An optimization device 10 includes $\Delta E$ calculation circuits 11p1, 11p2, . . . , and 11pn, a selection circuit 12, an identification information calculation unit 13, and a updating unit 14.

FIG. 1 illustrates the $\Delta E$ calculation circuits 11p1 to 11pn which calculate an energy change caused by state transition of Hamming distance=2 between a plural number (n) of bits included in a p-th group p in a case where N bits are divided into G groups. The same $\Delta E$ calculation circuit as the $\Delta E$ calculation circuits 11p1 to 11pn is provided for the other group, but is not illustrated in FIG. 1. In FIG. 1, a circuit for calculating a local field value and the like are also omitted. In the example in FIG. 1, the $\Delta E$ calculation circuits 11p1 to 11pn equal to or more than three are illustrated, but the number of $\Delta E$ calculation circuits is two in a case where the number of bits included in the group p is two.

When the group p satisfies the 1-hot constraint, among the n bits included in the group p, a value of one bit is 1 and values of the other bits are 0.

Hereinafter, among $x_{p1}, \ldots,$ and $x_{pn}$ indicating values of the n bits, one having a value of 1 is represented as $x_i$, and one having a value of 0 is represented as $x_j$. A local field value for the bit having a value of 1 is $h_i$, and a local field value for a bit having a value of 0 is $h_j$.

In the example in FIG. 1, based on the equation (7), the $\Delta E$ calculation circuits 11p2 to 11pn calculate $\Delta E_j$ while $x_i$ changes from 1 to 0 and $x_j$ changes from 0 to 1 based on $h_i$, $h_j$ and $W_{ij}$. $W_{ij}$ is stored in storage units 11p2a to 11pna in the $\Delta E$ calculation circuits 11p2 to 11pn.

In state transition of Hamming distance=2, there is also transition in which $x_i$ changes from 1 to 0 and further changes from 0 to 1. Meanwhile, since nothing is changed as a state, it is not desirable that such a state transition occurs so as to reduce the calculation time. In the example in FIG. 1, one $h_i$ is supplied to the $\Delta E$ calculation circuit 11p1. The $\Delta E$ calculation circuit 11p1 includes a storage unit 11p1a which stores $W_{ii}$ (=0).

In a case where the $\Delta E$ calculation circuit 11p1 calculates $\Delta E_i$ when $x_i$ changes twice as described above, based on $h_i$ and $W_{ii}$, the equation (7) is calculated when i=j, so that $\Delta E_i$=0. In a case of $\Delta E_i$=0, the state transition to be described above in which $x_i$ changes twice may be permitted by a process of the selection circuit 12 to be described below. In the selection circuit 12, the larger a positive value of the energy change, the lower a permission probability of the state transition causing the energy change. For this reason, the $\Delta E$ calculation circuit 11p1 to which one $h_i$ is supplied is controlled by the updating unit 14 so that a predetermined positive value (described as "$\Delta$Emax" in FIG. 1) is output. $\Delta$Emax is, for example, a positive maximum value which may be generated by the optimization device 10. For example, in a case where the optimization device 10 may generate a value of 26 bits, the positive maximum value is 01 . . . 1 (the number of 1 is 25) when represented in a complementary number of 2.

A control signal $EN_i$ (for example, 1) is supplied from the updating unit 14 to the $\Delta E$ calculation circuit 11p1, and the $\Delta E$ calculation circuit 11p1 outputs $\Delta$Emax described above. On the other hand, a control signal $EN_j$ (for example, 0) is supplied from the updating unit 14 to the $\Delta E$ calculation circuits 11p2 to 11pn, and the $\Delta E$ calculation circuits 11p2 to 11pn calculate $\Delta E_j$ represented by the equation (7).

The storage units 11p1a to 11pna are realized by, for example, a register, a static random-access memory (SRAM), or the like.

The selection circuit 12 outputs an index for identifying one permitted to be updated from a value of 0 to a value of 1 among bits, included in each of groups 1 to G, having values of 0, based on a magnitude relationship between thermal excitation energy and an energy change output from each of a plurality of $\Delta E$ calculation circuits. The thermal excitation energy is determined based on a random number and a temperature parameter (T) input from a control unit (not illustrated).

In a case where simulated annealing is performed, for example, T is controlled by the control unit so that a value becomes smaller each time a process of updating the state of the Ising model is repeated a predetermined number of times. An example of a circuit of executing a function of the selection circuit 12 as described above will be described below.

The identification information calculation unit 13 detects a group to which a bit permitted to be updated belongs based on the index output by the selection circuit 12, and outputs an index of identifying a bit having a value of 1 which belongs to the detected group. The identification information calculation unit 13 performs, for example, detection of a group and generation of an index by using a logic circuit or table data. An example of using the logic circuit or an example of using the table data will be described below.

Hereinafter, it is assumed that an index of a bit having a value of 0 output by the selection circuit 12 and the identification information calculation unit 13 is l, and an index of a bit having a value of 1 output by the identification information calculation unit 13 is k. In the example in FIG. 1, the identification information calculation unit 13 also outputs index=l, but in a case where index=l output by the selection circuit 12 is directly supplied to the updating unit 14, the identification information calculation unit 13 may not output index=l.

The updating unit 14 includes a storage unit 14a which holds values ($x_1$ to $x_N$) of N bits. The storage unit 14a is realized by, for example, using a register, an SRAM, or the like. The updating unit 14 updates a value of a bit identified by index=k output from the identification information calculation unit 13 from 1 to 0, and updates a value of a bit identified by index=l from 0 to 1. The updating unit 14 outputs the control signals $EN_i$ and $EN_j$ described above, based on $x_1$ to $x_N$.

Although not illustrated in FIG. 1, index=k, l is further used so as to update $h_i$ and $h_j$. The identification information calculation unit 13 may output group identification information (a group index) for identifying the detected group. The group index is used, for example, when updating $W_{ij}$. These processes will be described below.

Hereinafter, an operation example of the optimization device 10 will be described.

First, an initial setting is performed. For example, the initial setting includes a process in which after all of $x_1$ to $x_N$ are set to 0 under control of a control unit (not illustrated), a value of one bit is set to 1 and values of other bits are set to 0 in each group or setting of an initial value of a local field value. As the initial setting, a process of storing a weighted value in the storage units 11p1a to 11pna or a process of updating the local field value based on the set value of each bit is performed.

The ΔE calculation circuits 11p1 to 11pn output ΔEmax or calculate $\Delta E_j$ described above, and the selection circuit 12 outputs an index for identifying one permitted to be updated from a value of 0 to a value of 1.

For example, in a case where index=l output by the selection circuit 12 is equal to index=pn of a bit having a value of 0, the identification information calculation unit 13 detects the group p based on index=l. The identification information calculation unit 13 outputs index=p1 of a bit having a value of 1 in the group p as index=k.

The updating unit 14 receives index=k, l, updates $x_{p1}$ from 1 to 0, and updates $x_{pn}$ from 0 to 1. In this way, transition between the states satisfying the 1-hot constraint may be performed.

In a case where $x_{p1}$ is updated from 1 to 0 and $x_{pn}$ is updated from 0 to 1, $x_{pn}=x_i$, and among $x_{p1}$ to $x_{pn}$, a state variable other than $x_{pn}$ is $x_j$. For this reason, a local field value for a bit of index=pn (updated based on index=k, l) is $h_i$. A local field value for a bit of Index=p1 to p(n−1) (updated based on index=k, l) becomes $h_j$.

Thus, $h_i$ for the bit of index=pn is supplied to the ΔE calculation circuit 11pn. Among the ΔE calculation circuits 11p1 to 11pn, $h_i$ other than $h_j$ for one of the bits of index=p1 to p(n−1) is supplied to ones other than ΔE calculation circuit 11pn.

As described above, among the ΔE calculation circuits 11p1 to 11pn, the ΔE calculation circuit to which $h_i$ and $h_j$ are supplied changes each time a value of a bit belonging to the group p is updated. The weighted value stored in the storage units 11p1a to 11pna is also updated. A configuration for controlling the change of a supply destination of such a local field value and a configuration for updating the weighted value will be described below.

Thus, the ΔE calculation circuit 11pn outputs ΔEmax described above, and among the ΔE calculation circuits 11p1 to 11pn, others except for the ΔE calculation circuit 11pn calculate $\Delta E_j$. After then, the same process as described above is performed by the selection circuit 12, the identification information calculation unit 13, and the updating unit 14. A state ($x_1$ to $x_N$) obtained after such state updating process is repeated a predetermined number of times is output as a solution to the optimization problem.

The updating unit 14 may update energy based on $\Delta E_j$ corresponding to index=k, l, and may hold minimum energy at each update time and a state (a state at the minimum energy) when the minimum energy is obtained. In this case, the updating unit 14 may output the state at the minimum energy held when the state updating process is repeated the predetermined number of times, as a solution.

As described above, according to the optimization device 10 of the first embodiment, based on an energy change when both of one bit having a value of 1 and one bit having a value of 0 in each group are changed, it is determined which two bits are permitted to be transitioned. Then, values of the determined two bits are updated. In this way, the state transition not satisfying the 1-hot constraint is suppressed, and the search space may be made smaller. For this reason, it is possible to speed up the search of the ground state.

For example, in a case where N=1024 and all state variables are sequentially divided into groups for 4 variables from $x_1$ to $x_{1024}$, the total number of states is $2^{1024}$, that is, approximately $10^{307}$, while the number of states satisfying the 1-hot constraint is $4^{256}$, that is, approximately $10^{154}$. For example, as compared with a case of searching for a state of $2^{1024}$, the number of states to be searched decreases to $1/10^{153}$.

According to the optimization device 10, since the 1-hot constraint term of the second item on the right side of the equation (3) may be deleted, an energy barrier occurring due to the 1-hot constraint term may be reduced, and a time of the state transition may be shortened.

Since the 1-hot constraint term of the second item on the right side of the equation (3) may be deleted as described above, the number of bits for representing a weighted value may be reduced, and the amount of hardware for storing the weighted value may be reduced.

For example, when the optimization device 10 calculates a traffic optimization problem, in a case where N=16 and $\lambda_1=100$, a range of a weighted value is $4 \le W_{ij} \le 214$. On the other hand, in a case of eliminating the 1-hot constraint term of the second item on the right side of the equation (3) (for example, in the case of $\lambda_1=0$), the range of the weighted value is $4 \le W_{ij} \le 14$. For example, the number of bits for representing the weighted value may be reduced from 8 bits to 4 bits. In a case where a scale of the problem is increased, for example, N=1024 and $\lambda_1$=10000, the range of the weighted value is $4 \leq W_{ij} \leq 20108$. On the other hand, in a case of $\lambda_1$=0, the range of the weighted value is $4 \leq W_{ij} \leq 108$. For example, the number of bits for representing the weighted value may be reduced from 16 bits to 7 bits.

Thus, as a size of the problem increases, a reduction effect of the number of bits of the weighted value becomes more remarkable.

In a case where the same state variable appears in a plurality of 1-hot constraint terms, the above optimization device 10 does not exclude all 1-hot constraint terms from the energy function. For example, an energy function of the traveling salesman problem may be represented as $E(x) = \alpha D + \lambda_1 P_1 + \lambda_2 P_2$. D, $P_1$, and $P_2$ may be respectively represented as the following equation (8), equation (9), and equation (10).

$$D = \sum_{t=0}^{N-1} \sum_{c1=0}^{N-1} \sum_{c2=0}^{N-1} d(c_1, c_2) s(t, c_1) s((t+1) \% N, c_2) \quad (8)$$

$$P_1 = \sum_{t=0}^{N-1} \left( \sum_{c=0}^{N-1} s(t, c) - 1 \right)^2 \quad (9)$$

$$P_2 = \sum_{c=0}^{N-1} \left( \sum_{t=0}^{N-1} s(t, c) - 1 \right)^2 \quad (10)$$

In the equation (8), $s(t, c_1)$ is a function which becomes 1 when visiting a city $c_1$ at a time t and 0 otherwise, $d(c_1, c_2)$ is a distance between the city $c_1$ and a city $c_2$, and $s((t+1)\% N, c_2)$ is a function which becomes 1 when visiting the city $c_2$ at a time remaining after dividing a time t+1 by N and becomes 0 otherwise.

In the equations (9) and (10), s(t, c) is a function which becomes 1 when visiting the city c at the time t and becomes 0 otherwise. The city $c_1$, $c_2$, and c are represented by values of 0 to N−1, and the time t is also represented by values of 0 to N−1.

The equations (9) and (10) are respectively the 1-hot constraint terms. In the optimization device 10, one of the two 1-hot constraint terms may be deleted. Thus, an energy function may be $E(x) = \alpha D + \lambda_1 P_1$ or $E(x) = \alpha D + \lambda_2 P_2$.

Modification Example

Meanwhile, in a case where $x_i$ and $x_j$ have values of two bits belonging to the same group required to satisfy the same 1-hot constraint in $W_{ij} x_i x_j$ in the equation (4), since $x_i$ or $x_j$ is 0 (in the example in FIG. 1, $x_i$=1 and $x_j$=0), $W_{ij} x_i x_j$=0. For example, $W_{ij}$ does not contribute to energy. For this reason, it is possible that $W_{ij}$=0.

Figure 2:
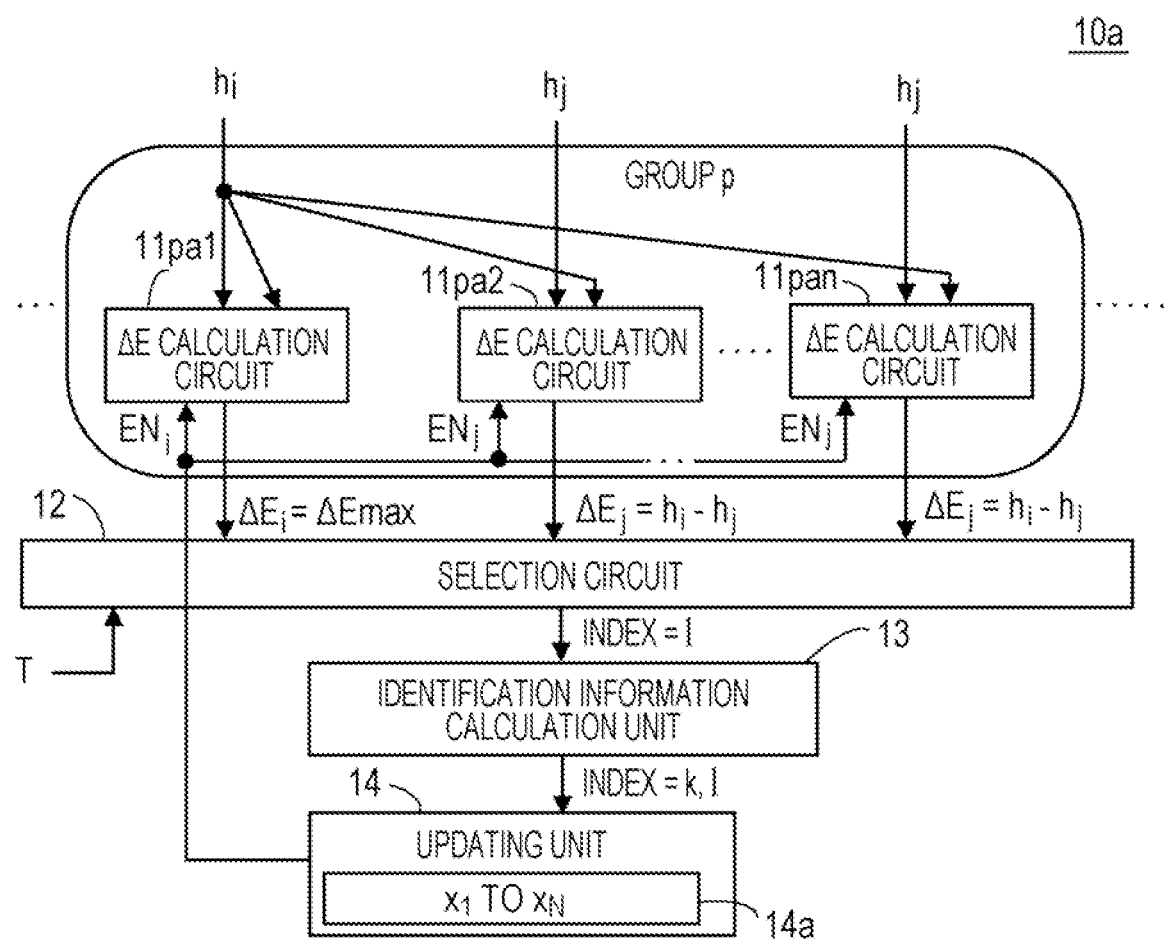
FIG. 2 is a diagram illustrating a modification example of the optimization device.

FIG. 2 is a diagram illustrating a modification example of the optimization device. In FIG. 2, the same elements as those illustrated in FIG. 1 are labeled with the same references. In the optimization device 10a, the $\Delta E$ calculation circuits 11pa1, 11pa2, . . . , and 11pan do not include the storage units 11p1a to 11pna which stores $W_{ii}$ or $W_{ij}$ unlike the $\Delta E$ calculation circuits 11p1 to 11pn illustrated in FIG. 1. Although the $\Delta E$ calculation circuit 11pa1 outputs $\Delta E_{max}$ in the same manner as the $\Delta E$ calculation circuit 11p1, the $\Delta E$ calculation circuits 11pa2 to 11pan calculate $h_i - h_j$ unlike the $\Delta E$ calculation circuits 11p2 to 11pn.

Second Embodiment

Figure 3:
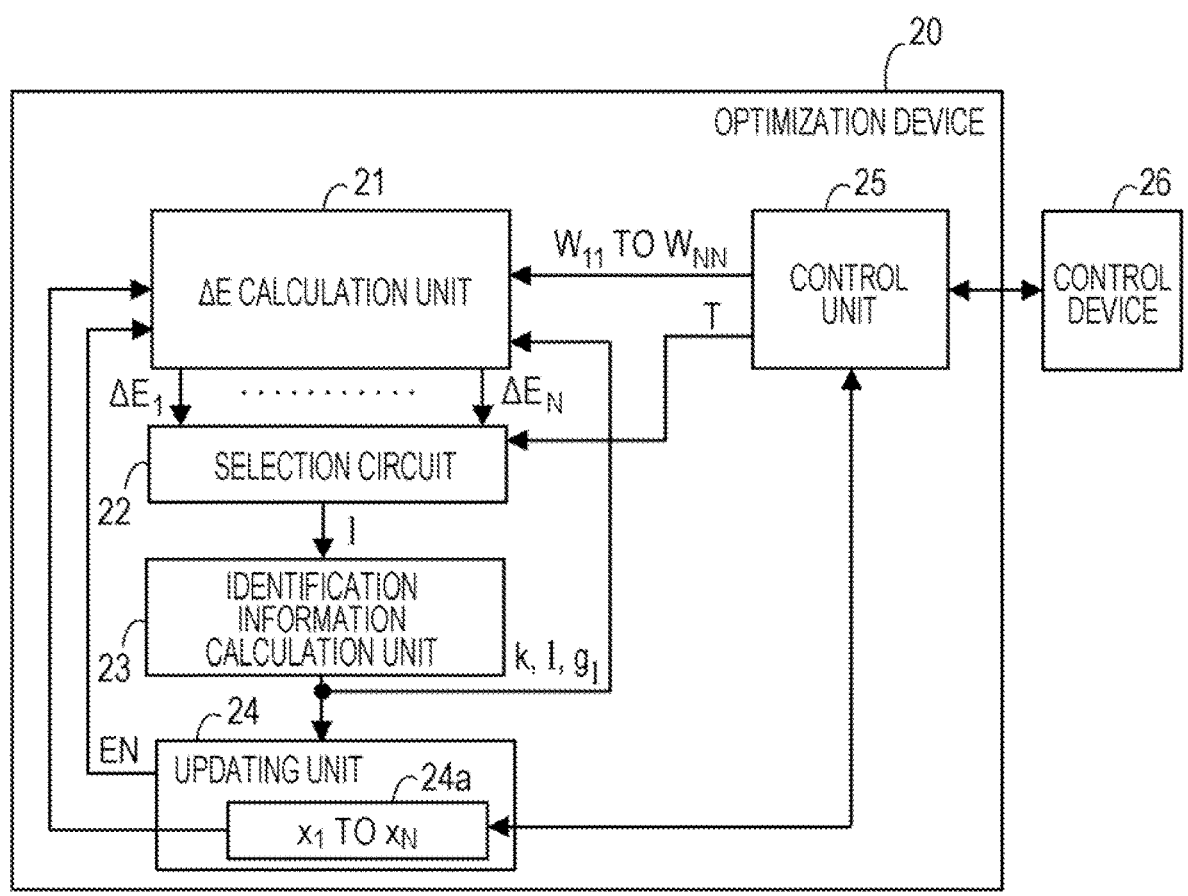
FIG. 3 is a diagram illustrating an example of an optimization device according to a second embodiment.

FIG. 3 is a diagram illustrating an example of an optimization device according to a second embodiment. An optimization device 20 includes a $\Delta E$ calculation unit 21, a selection circuit 22, an identification information calculation unit 23, an updating unit 24, and a control unit 25.

In each of the G groups described above, the $\Delta E$ calculation unit 21 calculates an energy change ($\Delta E_1$ to $\Delta E_N$) when transitioning from a state satisfying the 1-hot constraint to another state satisfying the 1-hot constraint by state transition of Hamming distance=2.

The selection circuit 22 outputs index=l for identifying one permitted to be updated from a value of 0 to a value of 1 among bits, included in each of groups 1 to G, having values of 0, based on a magnitude relationship between thermal excitation energy and $\Delta E_1$ to $\Delta E_N$. The thermal excitation energy is determined based on a random number and T input from the control unit 25. In some cases, depending on the magnitude relationship between the thermal excitation energy and $\Delta E_1$ to $\Delta E_N$, update is not permitted even for one of bits having a value of 0. Hereinafter, it is assumed that the selection circuit 22 outputs a flag indicating whether the update is permitted, together with index=l.

The identification information calculation unit 23 detects a group to which a bit permitted to be updated belongs based on index=l and the flag output by the selection circuit 22. The identification information calculation unit 23 outputs an index identifying a bit having a value of 1 belonging to the detected group, and group index=$g_l$ identifying the detected group. Hereinafter, the identification information calculation unit 23 also outputs index=l and the flag supplied from the selection circuit 22. Index=k, l is supplied to the $\Delta E$ calculation unit 21 and is used when updating a local field value for each bit used to calculate an energy change. Further, group index=$g_l$ is also supplied to the $\Delta E$ calculation unit 21 and is used, for example, when updating the weighted value held in each of the plurality of $\Delta E$ calculation circuits included in the $\Delta E$ calculation unit 21.

In a case where the flag is a value indicating that the update is not permitted, the identification information calculation unit 23 sets, for example, index=k, l and group index=g as an invalid value (for example, 0).

The updating unit 24 includes a storage unit 24a which holds values ($x_1$ to $x_N$) of N bits. The storage unit 24a is realized by, for example, using a register, an SRAM, or the like. In a case where the flag has a value to permit update, the updating unit 24 updates a value of a bit identified by index=k output from the identification information calculation unit 23 from 1 to 0, and updates a value of a bit identified by index=l from 0 to 1. The updating unit 24 may update energy based on an energy change corresponding to index=k, l, and may hold minimum energy at each update time and a state (a state at the minimum energy) when the minimum energy is obtained. The updating unit 24 supplies a control signal EN to the $\Delta E$ calculation unit 21, and supplies $x_1$ to $x_N$ to the $\Delta E$ calculation unit 21. An example of a process of the $\Delta E$ calculation unit 21 using the control signal EN or $x_1$ to $x_N$ will be described below.

The control unit 25 performs an initial setting process to be described below of the optimization device 20. Each time the process of updating the state of the Ising model is repeated the predetermined number of times, the control unit 25 reduces a value of T, for example, according to a temperature schedule designated by a control device 26.

The control unit 25 obtains a state ($x_1$ to $x_N$) held by the storage unit 24a after the state updating process is repeated the predetermined number of times, and transmits the state ($x_1$ to $x_N$) to the control device 26 as a solution for the optimization problem, for example. In a case where the storage unit 24a of the updating unit 24 holds minimum energy or the state at the minimum energy, after the state updating process is repeated the predetermined number of times, the control unit 25 may obtain information therefor, and may transmit the information to the control device 26.

The control unit 25 may be realized by an application specific electronic circuit such as an application-specific integrated circuit (ASIC), a field-programmable gate array (FPGA), or the like, for example. The control unit 25 may be a processor such as a central processing unit (CPU), a digital signal processor (DSP), or the like. In this case, the processor performs the process described above by executing a program stored in a memory (not illustrated).

(Example of ΔE Calculation Unit 21)

Figure 4:
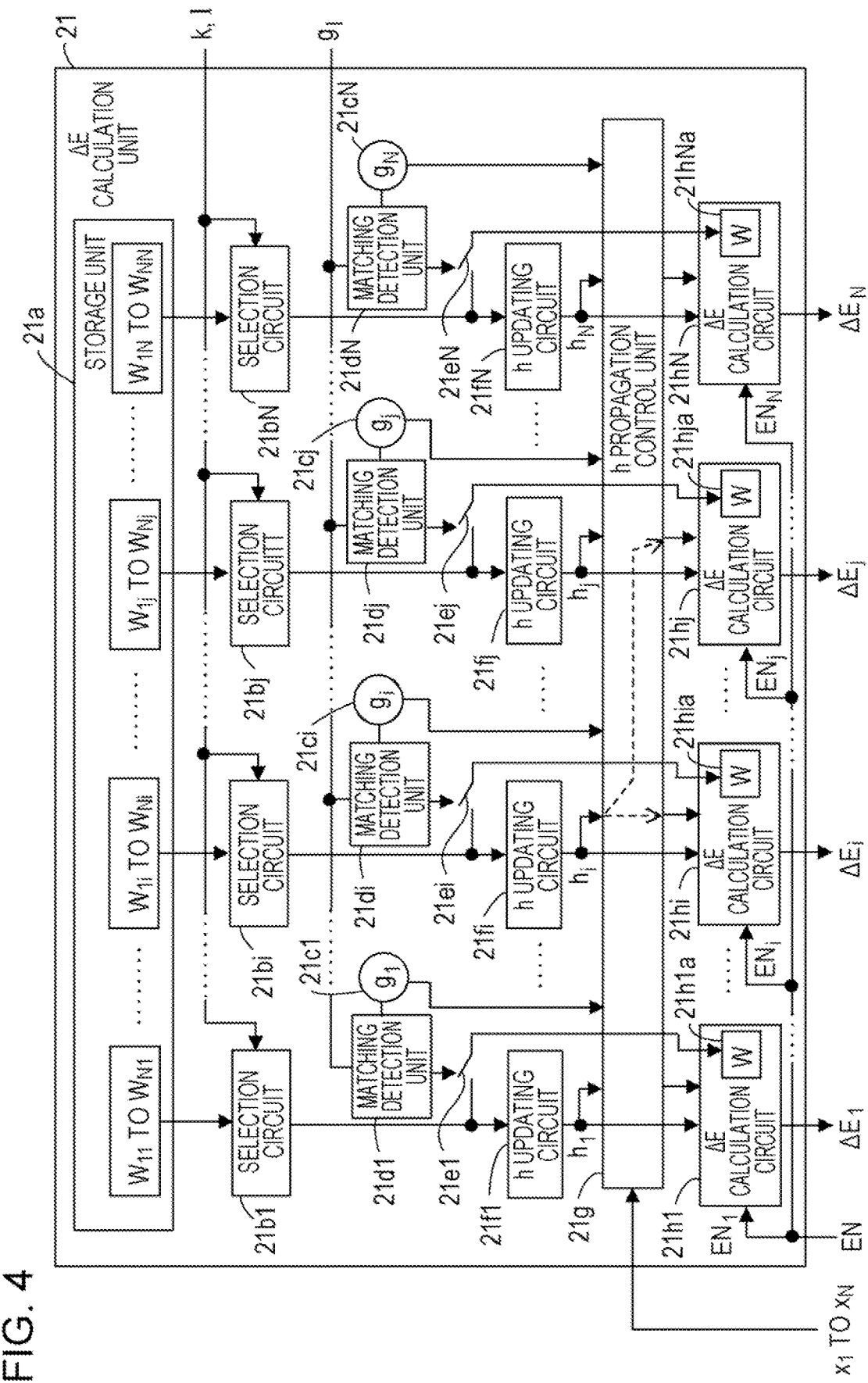
FIG. 4 is a diagram illustrating an example of a ΔE calculation unit.

FIG. 4 is a diagram illustrating an example of the ΔE calculation unit. The ΔE calculation unit 21 includes a storage unit 21a, selection circuits 21b1 to 21bN, holding units 21c1 to 21cN, matching detection units 21d1 to 21dN, switches 21e1 to 21eN, h updating circuits 21f1 to 21fN, an h propagation control unit 21g, and ΔE calculation circuits 21h1 to 21hN.

The storage unit 21a stores weighted values ($W_{11}$ to $W_{NN}$) indicating a magnitude of interaction among all bits corresponding to all spins included in the Ising model. $W_{11}$ to $W_{NN}$ is stored in the storage unit 21a by the control unit 25, at an initial setting process. The storage unit 21a is realized by, for example, using a register, an SRAM, or the like.

Each of the selection circuits 21b1 to 21bN selects two among the weighted values stored in the storage unit 21a based on index=k, l output by the identification information calculation unit 23, and outputs the two weighted values. For example, a selection circuit 21bi selects and outputs $W_{ki}$ and $W_{li}$ among $W_{1i}$ to $W_{Ni}$. For index=k, l, in a case where k is supplied to the selection circuit 21b1 first, the selection circuit 21b1 outputs $W_{ki}$ first, and in a case where l is supplied to the selection circuit 21b1 first, the selection circuit 21bi outputs $W_{li}$ first. In the same manner, a selection circuit 21bj selects and outputs $W_{kj}$ and $W_{lj}$ among $W_{1j}$ to $W_{Nj}$.

Each of the holding units 21c1 to 21cN holds one among group indexes ($g_1$ to $g_N$). For example, a holding unit 21ci holds $g_i$ which identifies a group to which a bit of index=i belongs. A holding unit 21cj holds $g_j$ which identifies a group to which a bit of index=j belongs.

Figure 5:
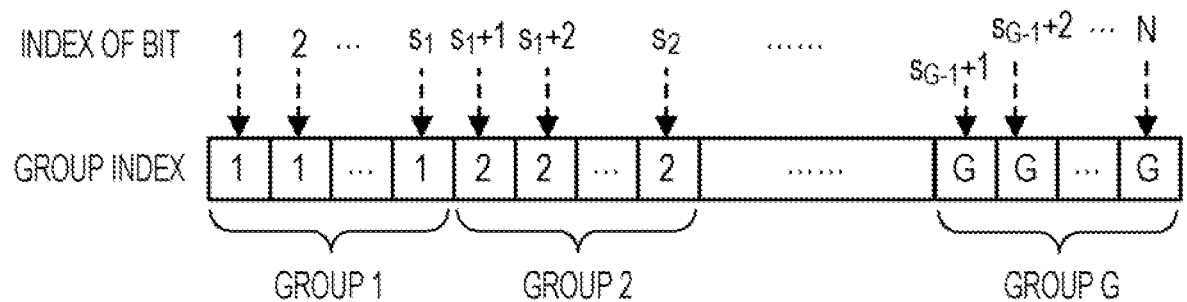
FIG. 5 is a diagram illustrating an example of a value of a group index.

FIG. 5 is a diagram illustrating an example of a value of a group index. In the example in FIG. 5, a group index of a group 1 to which bits having indexes of 1, 2, . . . , and $s_1$ belong is 1, and a group index of a group 2 to which bits having indexes of $s_1+1$, $s_1+2$, . . . , and $s_2$ belong is 2. A group index of a group G to which bits having indexes of $s_{G-1}+1$, $s_{G-1}+2$, . . . , and N belong is G.

Thus, as the group index of the group to which the bit having the smaller index belongs is assigned a smaller value. A total storage capacity of the holding units 21c1 to 21cN is determined by N. Each of the holding units 21c1 to 21cN is realized by, for example, using a register or an SRAM.

In FIG. 4, a circuit unit including the matching detection units 21d1 to 21dN and the switches 21e1 to 21eN has the following function. In a case where group index=$g_l$ supplied by the identification information calculation unit 23 and one of $g_1$ to $g_N$ match with each other, each of the matching detection units 21d1 to 21dN outputs 1, and the identification information calculation unit 23 and one of $g_1$ to $g_N$ do not match, each of the matching detection units 21d1 to 21dN outputs 0. For example, in a case of $g_l=g_i$, a matching detection unit 21di outputs 1, and in a case of $g_l \neq g_i$, the matching detection unit 21di outputs 0. In a case of $g_l=g_j$, a matching detection unit 21dj outputs 1, and in a case of $g_l \neq g_j$, the matching detection unit 21dj outputs 0. Each of the matching detection units 21d1 to 21dN is realized, for example, using a plurality of exclusive NOR (ExNOR) circuits and one logical product (AND) circuit. For example, each of the plurality of ExNOR circuits inputs values of bits corresponding to the two input group indexes, bit by bit, and outputs 1 in a case where both bits match with each other. The AND circuit outputs 1 in a case where the outputs of the plurality of ExNOR circuits are all 1.

Each of the switches 21e1 to 21eN supplies a weighted value output from one of the selection circuits 21b1 to 21bN to one of storage units 21h1a to 21hNa of the ΔE calculation circuits 21h1 to 21hN when in an on-state. Each of the switches 21e1 to 21eN is turned on in a case where one of the matching detection units 21d1 to 21dN outputs a value of 1. For example, a switch 21ei is turned on in a case where the matching detection unit 21di outputs 1, and supplies the weighted value output by the selection circuit 21bi to a storage unit 21hia of a ΔE calculation circuit 21hi. A switch 21ej is turned on in a case where the matching detection unit 21dj outputs 1, and supplies the weighted value output by the selection circuit 21bj to a storage unit 21hja of a ΔE calculation circuit 21hj. For example, each of the switches 21e1 to 21eN is a tri-state buffer.

Each of the h updating circuits 21f1 to 21fN includes a holding unit (for example, a register) (not illustrated), and holds and updates one of $h_1$ to $h_N$. For example, the h updating circuit 21fi updates $h_i$ by calculating $h_i - W_{ki} + W_{li}$, by using $W_{ki}$ and $W_{li}$ selected by the selection circuit 21bi. The h updating circuit 21fj calculates $h_j - W_{kj} + W_{lj}$ so as to update $h_j$ by using $W_{kj}$ and $W_{lj}$ selected by the selection circuit 21bj. Initial values of $h_1$ to $h_N$ are, for example, bias values ($b_1$ to $b_N$), and are set by the control unit 25 at the time of the initial setting process. The h updating circuits 21f1 to 21fN are realized, for example, by using an adder or a subtractor.

Based on $x_1$ to $x_N$ and $g_1$ to $g_N$, the h propagation control unit 21g controls a propagation destination (a supply destination) of a local field value for a bit having a value of 1. For example, in a case where a bit of index=i having a value of 1 and a bit of index=j having a value of 0 belong to the same group, the h propagation control unit 21g propagates $h_i$ output by the h updating circuit 21fi to the ΔE calculation circuit 21hi, and propagates $h_i$ to the ΔE calculation circuit 21hj to which $h_j$ is supplied.

Figure 6:
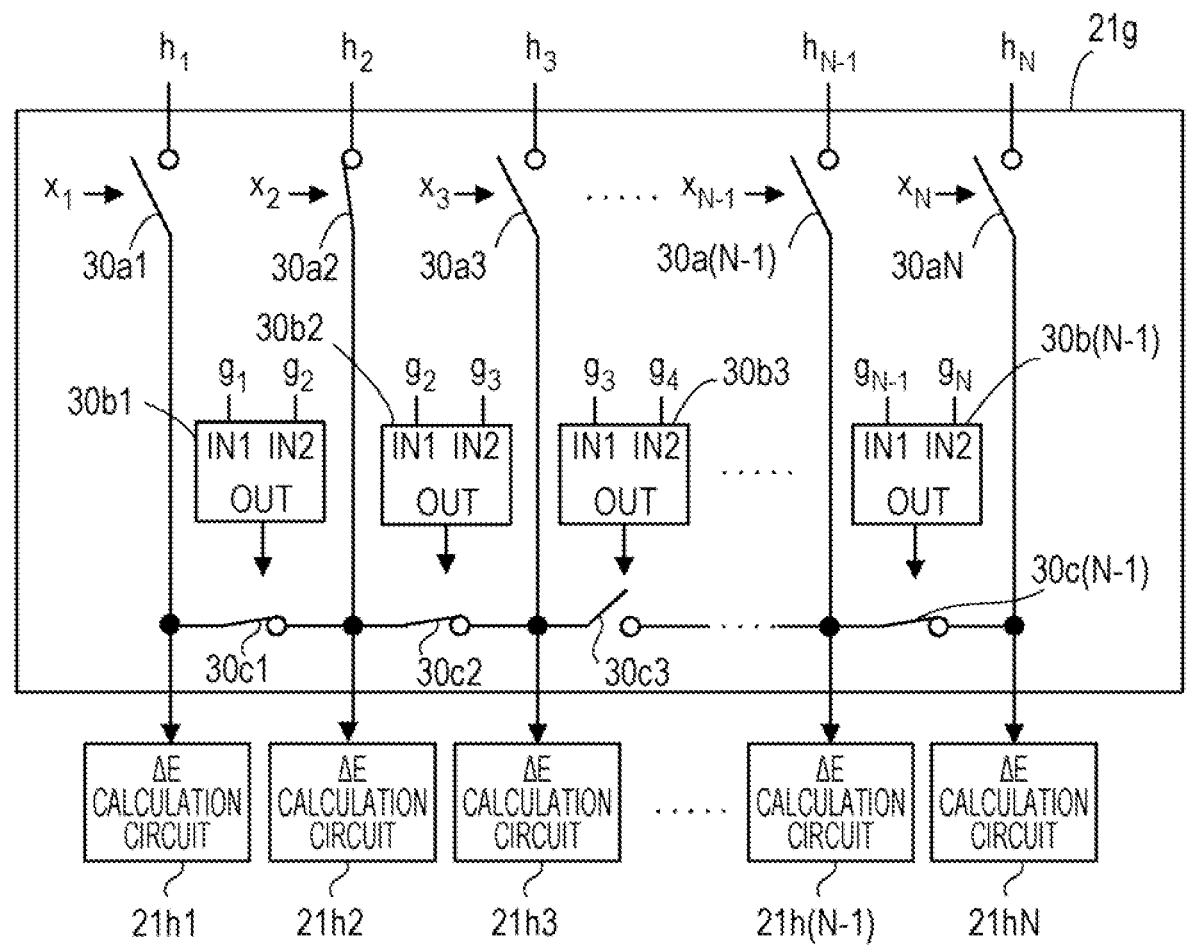
FIG. 6 is a diagram illustrating an example of an h propagation control unit.

FIG. 6 is a diagram illustrating an example of an h propagation control unit. The h propagation control unit 21g includes switches 30a1, 30a2, 30a3, . . . , 30a(N−1), and 30aN, control signal generation circuit 30b1, 30b2, 30b3, and 30b(N−1), switches 30c1, 30c2, 30c3, and 30c(N−1).

One of $x_1$ to $x_N$ is input to each of the switches 30a1 to 30aN, and the switches 30a1 to 30aN are turned on in a case where the input state variable is 1, and turned off in a case where the input is 0. One of $h_1$, $h_2$, $h_3$, . . . , $h_{N-1}$, and $h_N$ is input to one terminal of each of the switches 30a1 to 30aN, and the other terminal is coupled to one of the ΔE calculation circuits 21h1, 21h2, 21h3, . . . , 21h(N−1), and 21hN. For example, $h_1$ is input to one input terminal of the switch 30a1, and in a case where $x_1$ is 1, the switch 30a1 is turned on and $h_1$ is supplied to the ΔE calculation circuit 21h1.

Each of the control signal generation circuits 30b1 to 30b(N−1) includes input terminals IN1 and IN2 and an output terminal OUT. A group index of a group to which each of two bits having adjacent indexes belongs is input to the input terminals IN1 and IN2, and 1 is output from the output terminal OUT in a case where the two group indexes match with each other.

Figure 7:
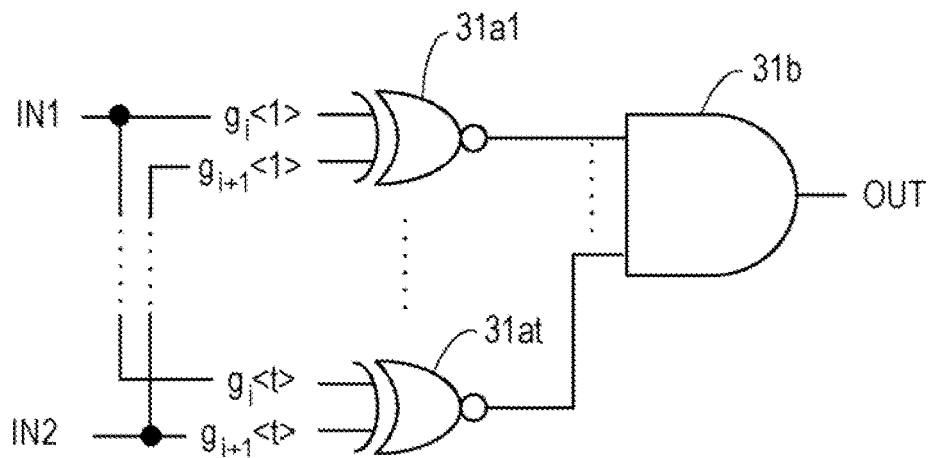
FIG. 7 is a diagram illustrating an exemplary configuration of a control signal generation circuit.

FIG. 7 is a diagram illustrating an exemplary configuration of a control signal generation circuit. FIG. 7 illustrates an example of the i-th control signal generation circuit 30$bi$ among the control signal generation circuits 30$b$1 to 30$b$(N−1) in FIG. 6.

The control signal generation circuit 30$bi$ includes t ExNOR circuits 31$a$1 to 31$at$ and an AND circuit 31$b$. t is the maximum value of the number of bits for representing a group index. In a case of N=1024, t is 10 at the maximum. Each of the ExNOR circuits 31$a$1 to 31$at$ receives a value of a bit corresponding to the two input group indexes bit by bit, and outputs 1 in a case where the two bits match with each other. For example, the ExNOR circuit 31$a$1 inputs the least significant bits $g_i$<1> and $g_{i+1}$<1> of $g_i$ and $g_{i+1}$, and outputs 1 in a case where the two bits match with each other. The ExNOR circuit 31$at$ inputs the most significant bits $g_i$<t> and $g_{i+1}$<t> of $g_i$ and $g_{i+1}$, and outputs 1 in a case where the two bits match with each other.

In a case where all the outputs of the ExNOR circuits 31$a$1 to 31$at$ are 1, the AND circuit 31$b$ outputs 1 and in a case where there is at least one 0 in the outputs of the ExNOR circuits 31$a$1 to 31$at$, the AND circuit 31$b$ outputs 0.

Each of the switches 30$c$1 to 30$c$(N−1) in FIG. 6 is coupled between the other terminals (sides coupled to the ΔE calculation circuit) of any two adjacent switches among the switches 30$a$1 to 30$a$N. Each of the switches 30$c$1 to 30$c$(N−1) is turned on in a case where a value output by one of the control signal generation circuits 30$b$1 to 30$b$(N−1) is 1.

For example, the switch 30$c$1 is coupled between the other terminals of the switches 30$a$1 and 30$a$2, and turns on in a case where the control signal generation circuit 30$b$1 outputs 1. Each of switches 30$a$1 to 30$a$N and 30$c$1 to 30$c$(N−1) is, for example, a transfer gate.

In the h propagation control unit 21$g$ as illustrated in FIG. 6, for example, bits of indexes=1 to 3 belong to the same group, and in a case where $x_2$=1, $x_1$ and $x_3$=0, the switches 30$a$1 and 30$a$3 are turned off and the switch 30$a$2 is turned on. Since $g_1$=$g_2$=$g_3$, the control signal generation circuits 30$b$1 and 30$b$2 output 1, and the switches 30$c$1 and 30$c$2 are turned on. Thus, $h_2$ is supplied to the ΔE calculation circuit 21$h$2 via the switch 30$a$2, and is supplied to the ΔE calculation circuit 21$h$1 via the switch 30$c$1 and supplied to the ΔE calculation circuit 21$h$3 via the switch 30$c$2.

In a case where a bit of index=4 belongs to a group different from the bits of indexes=1 to 3, g3≠g4, so that the control signal generation circuit 30$b$3 outputs 0 and the switch 30$c$3 is turned off.

Figure 8:
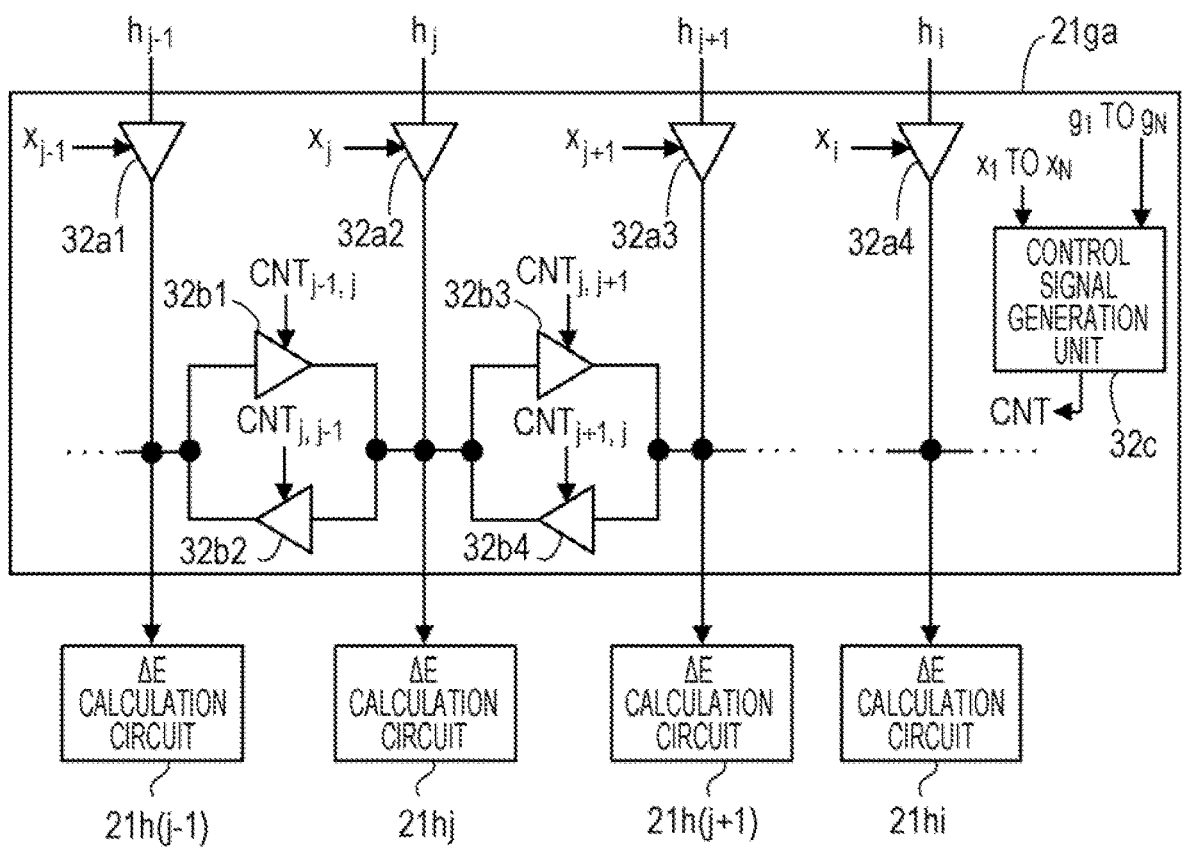
FIG. 8 is a diagram illustrating another example of the h propagation control unit.

FIG. 8 is a diagram illustrating another example of the h propagation control unit. FIG. 8 illustrates a part of the h propagation control unit 21$ga$ (a part which performs propagation control of $h_{j-1}$, $h_j$, $h_{j+1}$, $h_i$ on bits of index=j−1, j, j+1, i). The h propagation control unit 21$ga$ includes tri-state buffers 32$a$1, 32$a$2, 32$a$3, 32$a$4, 32$b$1, 32$b$2, 32$b$3, and 32$b$4, and a control signal generation unit 32$c$.

One of $h_{j-1}$, $h_j$, $h_{j+1}$, and $h_i$ is input to an input terminal of each of the tri-state buffers 32$a$1 to 32$a$4. An output terminal of each of the tri-state buffers 32$a$1 to 32$a$4 is coupled to one of ΔE calculation circuits 21$h$(j−1), 21$hj$, 21$h$(j+1), and 21$hi$. Each of the tri-state buffers 32$a$1 to 32$a$4 receives one of $x_{j-1}$, $x_j$, $x_{j+1}$, and $x_i$ as a control signal, and outputs a local field value input to the input terminal in a case where the control signal is 1 and sets the output terminal in a high impedance state in a case where the control signal is 0.

An input terminal of the tri-state buffer 32$b$1 and an output terminal of the tri-state buffer 32$b$2 are coupled to the output terminal of the tri-state buffer 32$a$1 and the ΔE calculation circuit 21$h$(j−1). An output terminal of the tri-state buffer 32$b$1 and an input terminal of the tri-state buffer 32$b$2 are coupled to an output terminal of the tri-state buffer 32$a$2 and the ΔE calculation circuit 21$hj$. An input terminal of the tri-state buffer 32$b$3 and an output terminal of the tri-state buffer 32$b$4 are coupled to the output terminal of the tri-state buffer 32$a$2 and the ΔE calculation circuit 21$hj$. An output terminal of the tri-state buffer 32$b$3 and an input terminal of the tri-state buffer 32$b$4 are coupled to an output terminal of the tri-state buffer 32$a$3 and the ΔE calculation circuit 21$h$(j+1). The tri-state buffer 32$b$1 receives a control signal $CNT_{j-1,\,j}$, and the tri-state buffer 32$b$2 receives the control signal $CNT_{j,\,j-1}$. The tri-state buffer 32$b$3 receives a control signal $CNT_{j,\,j+1}$, and the tri-state buffer 32$b$4 receives the control signal $CNT_{j+1,\,j}$. Each of the tri-state buffers 32$b$1 to 32$b$4 outputs an input signal from the output terminal in a case where the control signal is 1, and sets the output terminal in the high impedance state in a case where the control signal is 0.

The control signal generation unit 32$c$ generates control signals CNT (including $CNT_{j-1,\,j}$, $CNT_{j,\,j-1}$, $CNT_{j,\,j+1}$, and $CNT_{j+1,\,j}$) based on $g_1$ to $g_N$ and $x_1$ to $x_N$. For example, the control signal generation unit 32$c$ is a logic circuit which outputs a control signal according to the following relationship.

FIG. 9 is a diagram illustrating an example of a control signal output by a control signal generation unit. Index=i is an index of a bit having a value of 1 and index=j is an index of a bit having a value of 0. DIR(j) is a variable which is 0 in a case of i>j, 1 in a case of i=j, and 2 in a case of i<j.

In a case where bits of index=j−1, j, j+1 belong to the same group ($g_{j-1}$=$g_j$=$g_{j+1}$) and DIR(j)=0, the control signals $CNT_{j-1,\,j}$ and $CNT_{j,\,j+1}$ are 0 and the control signals $CNT_{j,\,j-1}$ and $CNT_{j+1,\,j}$ are 1. For this reason, in FIG. 8, $h_i$ is supplied to the ΔE calculation circuit 21$hj$ via the tri-state buffer 32$b$4, and is supplied to the ΔE calculation circuit 21$h$(j−1) via the tri-state buffer 32$b$2.

In a case where $g_{j-1}$=$g_j$=$g_{j+1}$ and DIR(j)=1, the control signals $CNT_{j-1,\,j}$ and $CNT_{j+1,\,j}$ are 0 and the control signals $CNT_{j,\,j-1}$ and CNT are 1. In this case, in FIG. 8, $h_j$=$h_i$, and $h_i$ is supplied to the ΔE calculation circuit 21$h$(j+1) via the tri-state buffer 32$b$3 and supplied to the ΔE calculation circuit 21$h$(j−1) via the tri-state buffer 32$b$2.

In a case where $g_{j-1}$=$g_j$=$g_{i+1}$ and DIR(j)=2, the control signals $CNT_{j,\,j-1}$ and $CNT_{j+1,\,j}$ are 0 and the control signals $CNT_{j-1,\,j}$ and $CNT_{j,\,j-1}$ are 1. For this reason, in FIG. 8, $h_i$ is supplied to the ΔE calculation circuit 21$hj$ via the tri-state buffer 32$b$1, and is supplied to the ΔE calculation circuit 21$h$(j+1) via the tri-state buffer 32$b$3.

In a case where bits of index=j−1, j belong to different groups ($g_{j-1}$≠$g_j$) and bits of index=j, j+1 belong to the same group ($g_j$=$g_{j+1}$), the following is obtained. In a case of DIR(j)=0, the control signals $CNT_{j-1,\,j}$, $CNT_{j,\,j-1}$ and $CNT_{j,\,j+1}$ are 0 and the control signal $CNT_{j+1,\,j}$ is 1. For this reason, $h_j$ is supplied to the ΔE calculation circuit 21$hj$ via the tri-state buffer 32$b$4. In a case of DIR(j)=1, the control signals $CNT_{j-1,\,j}$, $CNT_{j,\,j-1}$, and $CNT_{j+1,\,j}$ are 0 and the control signal $CNT_{j,\,j+1}$ is 1. In this case, in FIG. 8, $h_j$=$h_i$, and $h_i$ is supplied to the ΔE calculation circuit 21$h$(j+1) via the tri-state buffer 32$b$3. Since bits of index=i, j is in separate groups, and there is no bit having a value of 1 in the group, a case of $g_{j-1}$≠$g_j$ and $g_j$=$g_{j+1}$ and DIR(j)=2 may not occur in the optimization device 20 which performs transition between states satisfying the 1-hot constraint.

In the same manner, a case where bits of index=j−1, j belong to the same group ($g_{j−1}=g_j$) and bits of index=j, j+1 belong to different groups ($g_j \neq g_{j+1}$) and DIR(j)=0 may not occur. In a case where $g_{j−1}=g_j$ and $g_j \neq g_{j−1}$ and DIR(j)=1, the control signals $CNT_{j−1, j}$, $CNT_{j+1, j}$, and $CNT_{j, j+1}$ are 0 and the control signal $CNT_{j, j−1}$ is 1. In this case, in FIG. 8, $h_j=h_i$, and $h_i$ is supplied to the $\Delta E$ calculation circuit 21h(j−1) via the tri-state buffer 32b2. In a case where $g_{j−1} \neq g_j$ and $g_j = g_{j+1}$ and DIR(j)=2, the control signals $CNT_{j, j−1}$, $CNT_{j+1, j}$, and $CNT_{j, j+1}$ are 0 and the control signal $CNT_{j−1, j}$ is 1. In this case, $h_i$ is supplied to the $\Delta E$ calculation circuit 21hj via the tri-state buffer 32b1.

A case where bits of index=j−1, j, and j+1 belong to different groups ($g_{j−1} \neq g_j \neq g_{j+1}$), may not occur regardless of a value of DIR(j) ("φ" in FIG. 9 indicates don't care) since bits of index=i, j are in separate groups.

Returning to the description in FIG. 4. The $\Delta E$ calculation circuits 21h1 to 21hN calculate $\Delta E_1$ to $\Delta E_N$ when transitioning from a state satisfying the 1-hot constraint to another state satisfying the 1-hot constraint by state transition of Hamming distance=2 by using a local field value and a weighted value.

One of $h_1$ to $h_N$ is directly supplied from one of the h updating circuits 21f1 to 21fN to each of the $\Delta E$ calculation circuits 21h1 to 21hN. The h propagation control unit 21g propagates a local field value for a bit having a value of 1 belonging to the same group as a bit having a value of 0 to the $\Delta E$ calculation circuit to which a local field value of the bit is supplied from one of the h updating circuits 21f1 to 21fN.

Figure 10:
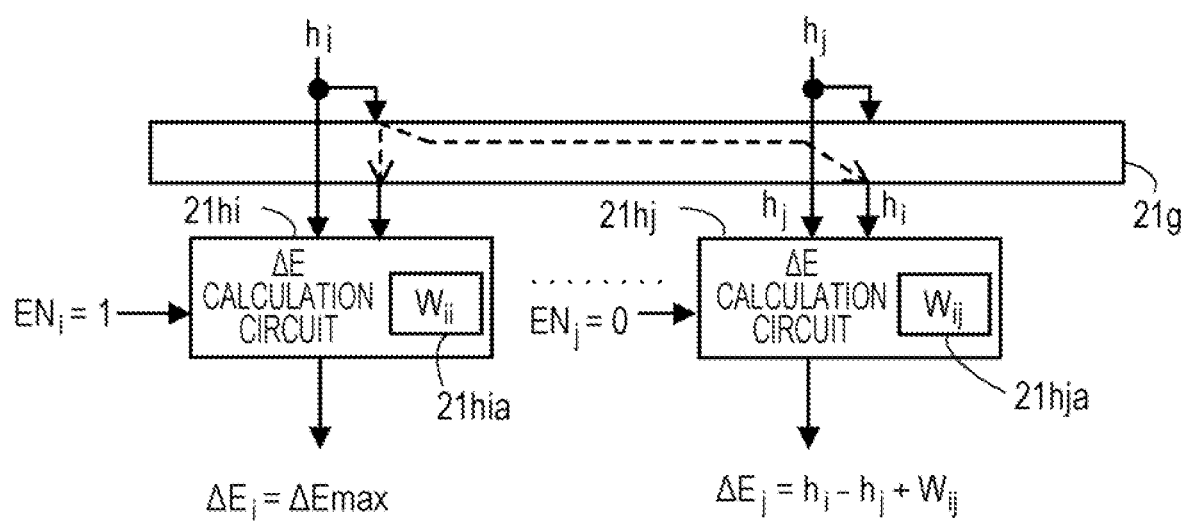
FIG. 10 is a diagram illustrating an example of a process by a ΔE calculation circuit.

The $\Delta E$ calculation circuits 21h1 to 21hN include the storage units 21h1a to 21hNa which hold weighted values for calculating the equation (7). FIG. 10 is a diagram illustrating an example of a process by a $\Delta E$ calculation circuit.

In a certain group, the h propagation control unit 21g propagates $h_i$ for a bit having a value of 1 belonging to the same group as a bit having a value of 0 to the $\Delta E$ calculation circuit 21hj to which $h_j$ for the bit is directly supplied from the h updating circuit 21fj. The storage unit 21hja of the $\Delta E$ calculation circuit 21hj holds the weighted value $W_{ij}$. $W_{ij}$ is a weighted value output by the selection circuit 21bj when the switch 21ej is in an on-state. Among weighted values read from the storage unit 21a for performing update of $h_j$, since $W_{ij}$ used for calculating $\Delta E_j$ is stored in the storage unit 21hja, $W_{ij}$ when calculating $\Delta E_j$ may be read from the storage unit 21a again.

Based on the equation (7), the $\Delta E$ calculation circuit 21hj calculates $\Delta E_j$ while $x_i$ changes from 1 to 0 and $x_j$ changes from 0 to 1 based on $h_i$, $h_j$ and $W_{ij}$.

$h_i$ is supplied to the $\Delta E$ calculation circuit 21hi and the storage unit 21hia holds the weighted value $W_{ii}$. As described in the optimization device 10 according to the first embodiment, in order to avoid state transition of the Hamming distance=2 by the same bit, the $\Delta E$ calculation circuit 21hi is controlled by the control signal $EN_i$=1 to output $\Delta E$max which is a predetermined positive value. $\Delta E$max is, for example, a positive maximum value which may be generated by the optimization device 20. The control signal $EN_j$=0 is supplied to the $\Delta E$ calculation circuit 21hj, and a function of outputting $\Delta E$max is invalid. For example, the control signal $EN_i$=1 is supplied to the $\Delta E$ calculation circuit 21hi which directly receives $h_i$ for a bit having a value of 1, and the control signal $EN_j$=0 is supplied to the $\Delta E$ calculation circuit 21hj which directly receives $h_j$ for a bit having a value of 0. The control signals $EN_i$ and $EN_j$ are generated by the updating unit 24 based on $x_1$ to $x_N$.

(Example of Selection Circuit 22)

Figure 11:
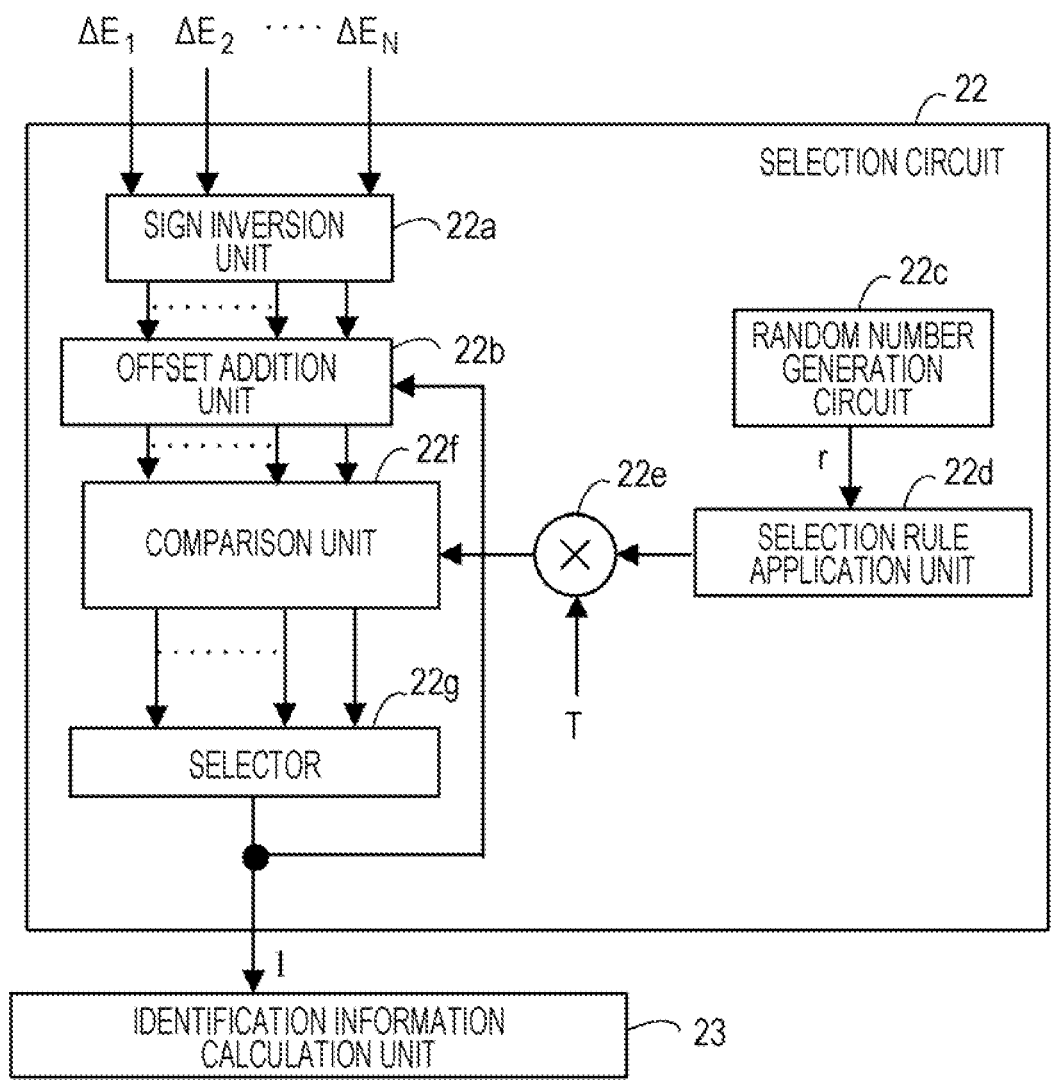
FIG. 11 is a diagram illustrating an example of a selection circuit.

FIG. 11 is a diagram illustrating an example of a selection circuit. The selection circuit 22 includes a sign inversion unit 22a, an offset addition unit 22b, a random number generation circuit 22c, a selection rule application unit 22d, a multiplier 22e, a comparison unit 22f, and a selector 22g.

The sign inversion unit 22a multiplies each of $\Delta E_1$, $\Delta E_2$, . . . , and $\Delta E_N$ by −1 to invert a sign. The offset addition unit 22b adds an offset value to each of output values (~$\Delta E_1$ to ~$\Delta E_N$) of the sign inversion unit 22a. The offset addition unit 22b increases the offset value when a flag output by the selector 22g to be described below indicates that update is not permitted (for example, when state transition does not occur). On the other hand, the offset addition unit 22b sets the offset value to 0 when the flag indicates that update is permitted (for example, when the state transition occurs). As the offset value becomes large, it is easier to permit the state transition, and in a case where the current state is in the local solution, the escape from the local solution is promoted.

The random number generation circuit 22c generates uniform random numbers (r) equal to or more than 0 and equal to or less than 1. The selection rule application unit 22d outputs a value based on a selection rule (a metropolis method or Gibbs method) for performing simulated annealing.

In a case where simulated annealing is performed, when a permission probability A ($\Delta E$, T) of the state transition which causes a certain energy change is determined as in the following equations (11) and (12), it is known that the state reaches an optimal solution at the limit of time (number of times of reiteration) of infinity.

$$A(\Delta E, T) = f(-\Delta E / T) \tag{11}$$

$$f(-\Delta E/T) = \begin{cases} \min[1, \exp(-\Delta E/T)] & \text{metropolis method} \\ 1/[1 + \exp(\Delta E/T)] & \text{Gibbs method} \end{cases} \tag{12}$$

In the equations (11) and (12), T is the temperature parameter described above. In a case of using the permission probability A($\Delta E$, T) represented by the equation (11), when a normal state is reached after sufficient reiteration, an occupancy probability of each state follows the Boltzmann distribution for a thermal equilibrium state in thermodynamics. Since the occupancy probability of a low energy state increases when a temperature is gradually lowered from the high temperature, the low energy state is obtained when the temperature is sufficiently lowered. Since the behavior is similar to a state change when annealing the material, the method is called simulated annealing. At this time, a case where the state transition in which energy increases probabilistically occurs corresponds to thermal excitation in physics.

It is possible to realize a circuit which outputs a flag (=1) indicating that state transition which causes $\Delta E$ with the permission probability A($\Delta E$, T) is permitted, by a comparator which outputs a value based on a comparison result of f(−$\Delta E$/T) in the equations (11) and (12) and the uniform random number r.

Meanwhile, it is also possible to realize the same function even when the following modification is made. Even when the same monotonically increasing function acts on two numbers, a magnitude relationship does not change. Therefore, even when the same monotonically increasing function acts on two inputs of the comparator, the output of the comparator does not change. For example, it is possible to use $f^{-1}(-\Delta E/T)$ which is an inverse function of $f(-\Delta E/T)$ as a monotonically increasing function which acts on $f(-\Delta E/T)$ and $f^{-1}(r)$ obtained by setting $-\Delta E/T$ of $f^{-1}(-\Delta E/T)$ to r as a monotonically increasing function which acts on a uniform random number. In this case, a circuit having the same function as the above-described comparator may be a circuit which outputs 1 when $-\Delta E/T$ is greater than $f^{-1}(r)$. Since T is positive, the circuit may be a circuit which outputs 1 when $-\Delta E$ is larger than $T \cdot f^{-1}(r)$.

The selection rule application unit 22d outputs a value of $f^{-1}(r)$ by using a conversion table for converting the input uniform random number into a value of $f^{-1}(r)$ described above. In a case where the metropolis method is applied, $f^{-1}(r)$ is $\log(r)$. The conversion table is stored, for example, in a memory such as a random-access memory (RAM), a flash memory, or the like.

The multiplier 22e outputs a product $(T \cdot f^{-1}(r))$ of T and $f^{-1}(r)$. $T \cdot f^{-1}(r)$ corresponds to thermal excitation energy.

The comparison unit 22f compares an addition result by the offset addition unit 22b for each of $\Delta E_1$ to $\Delta E_N$ with $T \cdot f^{-1}(r)$, and outputs 1 as a flag for the addition result larger than $T \cdot f(r)$. The comparison unit 22f outputs 0 as a flag for the addition result equal to or less than $T \cdot f^{-1}(r)$.

Based on a flag for each of $\Delta E_1$ to $\Delta E_N$, the selector 22g outputs index=l of a bit permitted to be updated and the flag. In a case where there are a plurality of bits permitted to be updated, an index of one bit among the bits is output as index=l based on a random number. Even in a case where there is no bit permitted to be updated, an index of any bit is output. In this case, the flag output by the selector 22g is 0.

For example, the selector 22g outputs an N-bit value in which a value of the l-th bit is 1 and values of the other bits are 0, as index=l.

The selection circuit 12 of the optimization device 10 according to the first embodiment illustrated in FIG. 1 may also be realized by using the circuit as illustrated in FIG. 11.

(Example of Identification Information Calculation Unit 23)

Figure 12:
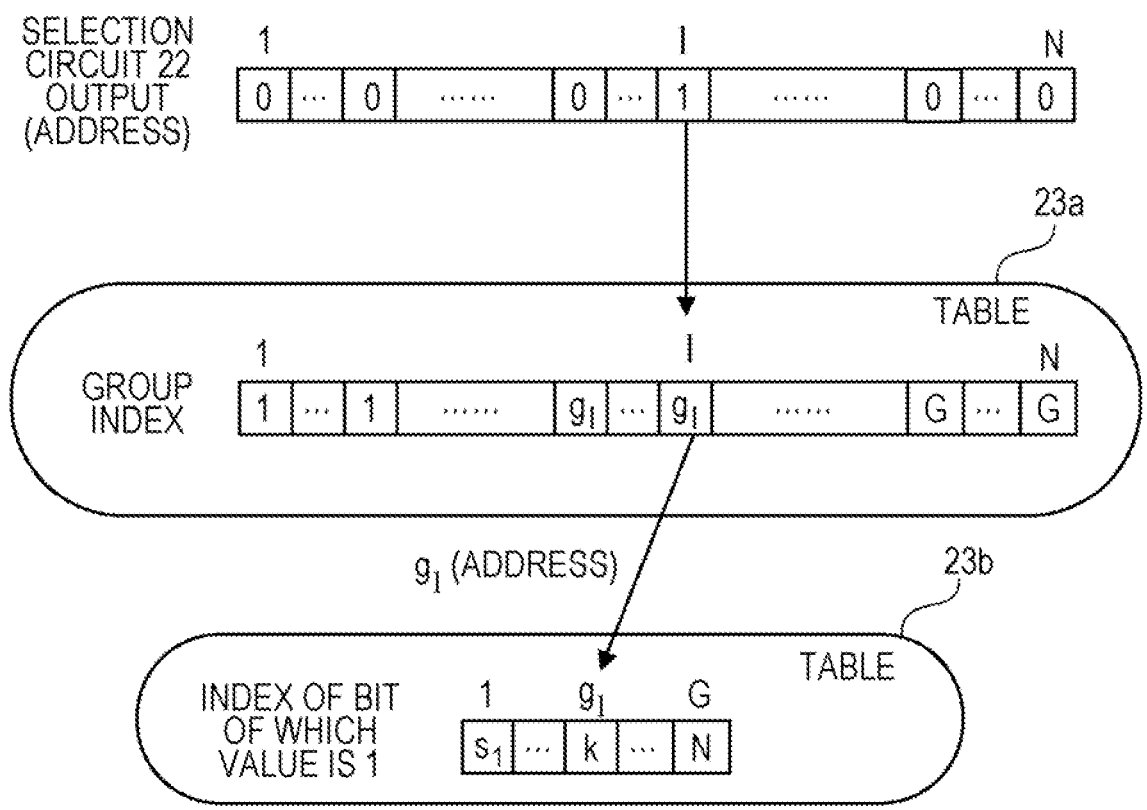
FIG. 12 is a diagram illustrating an example of an identification information calculation unit.

FIG. 12 is a diagram illustrating an example of an identification information calculation unit. In the example in FIG. 12, the identification information calculation unit 23 outputs $g_l$ which is a group index or k which is an index of a bit having a value of 1 by using tables 23a and 23b. The tables 23a and 23b are stored, for example, in a memory such as a RAM, a flash memory, or the like.

The table 23a is a table in which group indexes of groups to which the N bits respectively belong are arranged in ascending order. The identification information calculation unit 23 uses an N-bit value, in which a value of the l-th bit is 1 and values of the other bits are 0, output from the selection circuit 22 as index=l, as an address for accessing the group index of the table 23a. In a case where the value of the l-th bit is 1, the l-th group index=$g_l$ is output in the table 23a.

The table 23b is a table in which indexes of bits having a value of 1 are arranged in ascending order, for each of the G groups. In the example in FIG. 12, an index of a bit having a value of 1 belonging to a group having group index=1 is $s_1$, and an index of a bit having a value of 1 belonging to a group of group index=G is N. An index of a bit having a value of 1 belonging to a group of group index=$g_l$ is k.

The identification information calculation unit 23 uses group index=$g_l$ output using the table 23a as an address for accessing an index of the table 23b. The identification information calculation unit 23 outputs the $g_l$-th index=k among the indexes arranged in the table 23a. The table 23b is updated each time a state updating process is performed.

Figure 13:
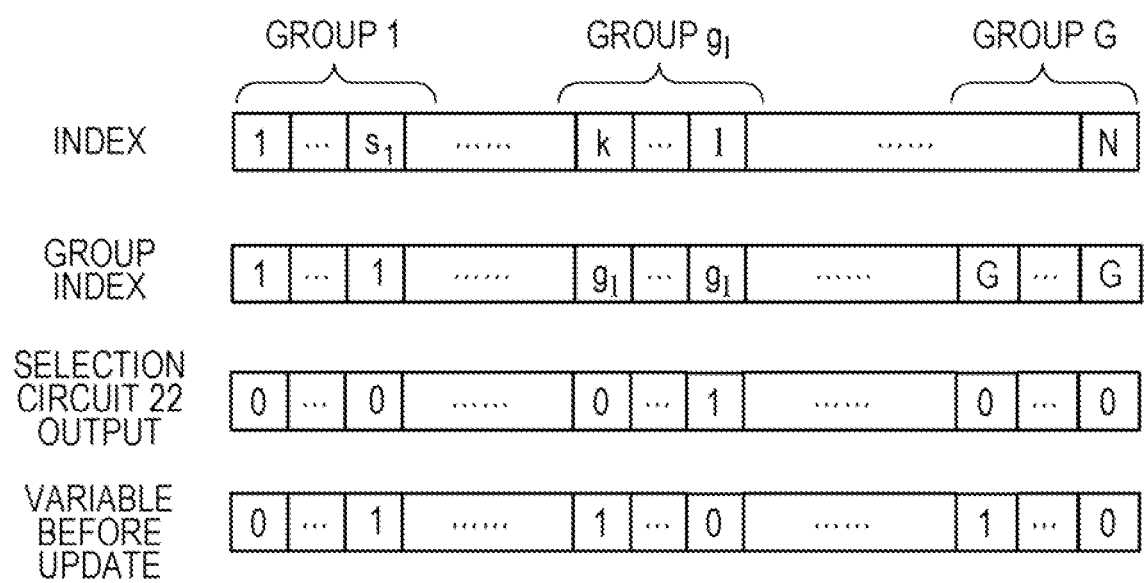
FIG. 13 is a diagram illustrating an example of state variables before output and update of an index, a group index, and a selection circuit.

Hereinafter, another example of the identification information calculation unit 23 will be described. FIG. 13 is a diagram illustrating an example of state variables before output and update of an index, a group index, and a selection circuit.

Bits of index=k, l belong to a group $g_l$ of group index=$g_l$. The selection circuit 22 outputs an N-bit value in which a value of the l-th bit is 1 and values of the other bits are 0, as index=l. By integrating a product of a group index corresponding to each of indexes=1 to N and one bit among N-bit values output from the selection circuit 22, group index=$g_l$ is obtained. For example, $g_l$ may be represented by the following equation (13).

$$g_l = \sum_{i=1}^{N} sl_i \cdot g_i \qquad (13)$$

In the equation (13), $sl_i$ is a value of the i-th bit of the N-bit values output from the selection circuit 22, and $g_i$ is the i-th group index among $g_1$ to $g_N$.

On the other hand, an index k may be represented by the following equation (14).

$$k = \sum_{i=1}^{N} i(q_i \cdot x_i) \qquad (14)$$

In the equation (14), $q_i$ is a variable which is 1 when $g_i = g_l$ and 0 when $g_i \neq g_l$.

The equations (13) and (14) may be calculated, for example, by the following logic circuit.

Figure 14:
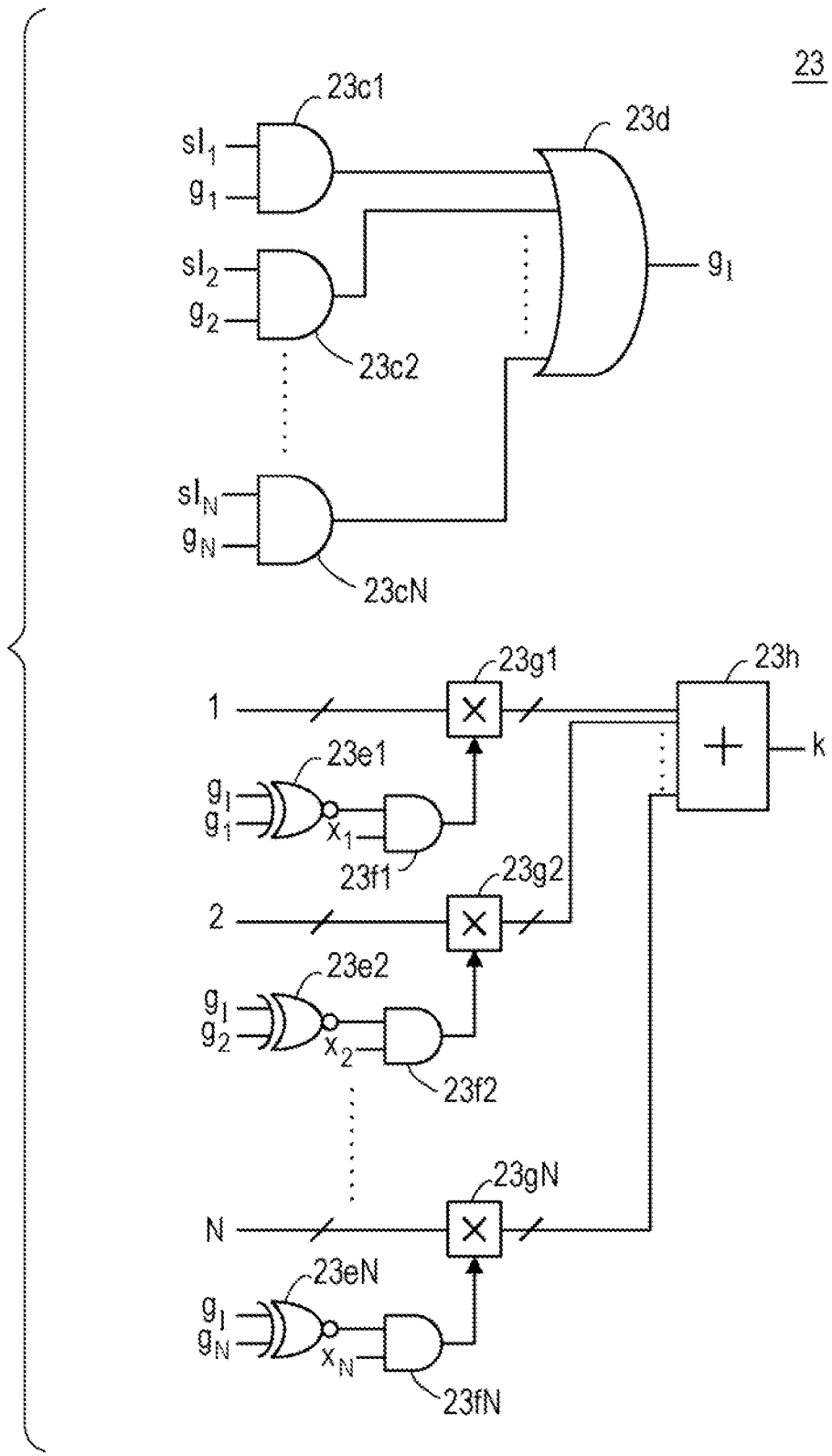
FIG. 14 is a diagram illustrating another example of the identification information calculation unit.

FIG. 14 is a diagram illustrating another example of the identification information calculation unit. The identification information calculation unit 23 includes AND circuits 23c1, 23c2, . . . , and 23cN and an OR (logical sum) circuit 23d. The identification information calculation unit 23 includes ExNOR circuits 23e1, 23e2, . . . , and 23eN, AND circuits 23f1, 23f2, . . . , and 23fN, multipliers 23g1, 23g2, . . . , and 23gN, and an adder 23h.

By the AND circuits 23c1 to 23cN and the OR circuit 23d, group index=$g_l$ represented by the above equation (13) is calculated. Each of the AND circuits 23c1 to 23cN outputs $sl_i \cdot g_i$(i=1 to N) of the equation (13).

The OR circuit 23d outputs $g_l$ which is a logical sum of output values of the AND circuits 23c1 to 23cN. By the ExNOR circuits 23e1 to 23eN, the AND circuits 23f1 to 23fN, the multipliers 23g1 to 23gN, and the adder 23h, index=k represented by the above equation (14) is calculated. The ExNOR circuits 23e1 to 23eN output $q_i$(i=1 to N) of the equation (14).

The AND circuits 23f1 to 23fN output $q_i \cdot x_i$ of the equation (14). The multipliers 23g1 to 23gN output $i(q_i \cdot x_i)$ of the equation (14). i, which is 1 to N, is represented by $\log_2 N$ bits.

The adder 23h adds output values of the multipliers 23g1 to 23gN so as to output index=k. The identification information calculation unit 23 also outputs a flag or index=l output from the selection circuit 22. For example, the identification information calculation unit 23 may first output the flag and index=k, and then output the flag and index=l together with group index=$g_l$.

In the identification information calculation unit 13 of the optimization device 10 according to the first embodiment illustrated in FIG. 1, it is also possible to output index=k and group index=$g_l$ by using the tables 23a and 23b illustrated in FIG. 13 or the circuit illustrated in FIG. 14.

(Example of Overall Operation of Optimization Device 20)

Figure 15:
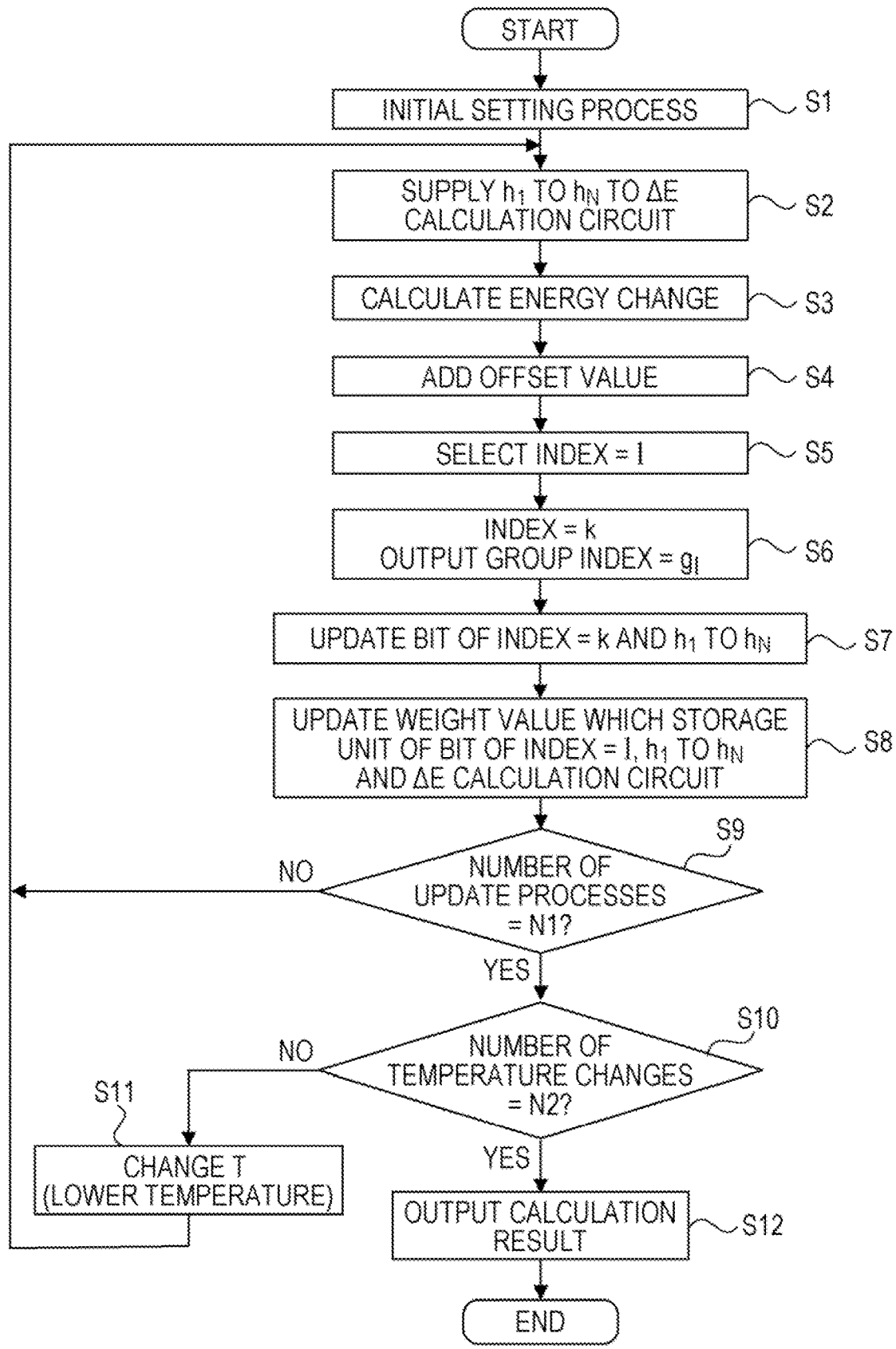
FIG. 15 is a flowchart illustrating a flow of a process of an example of the optimization device according to the second embodiment.

FIG. 15 is a flowchart illustrating a flow of a process of an example of the optimization device according to the second embodiment.

Figure 16:
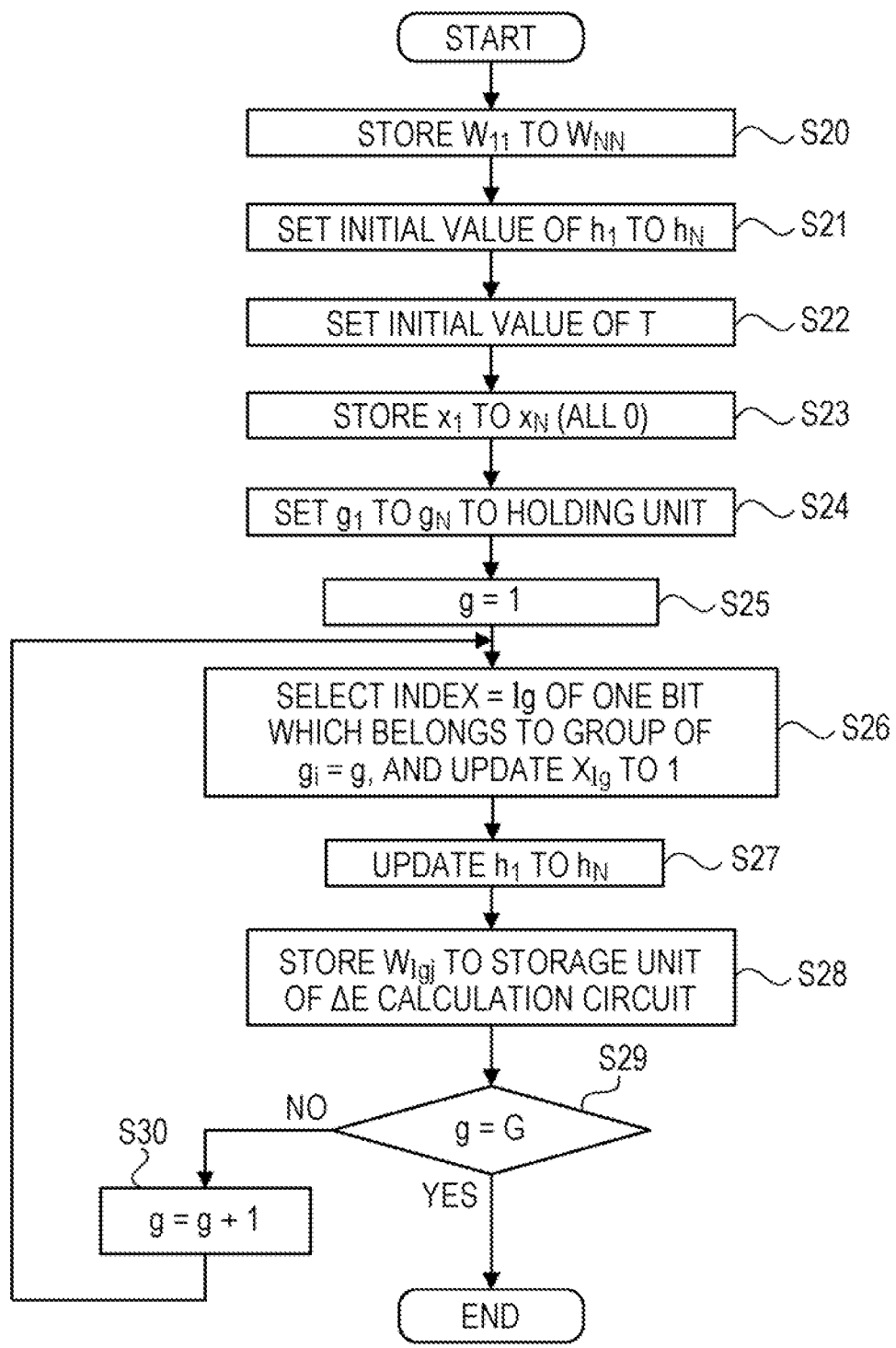
FIG. 16 is a flowchart illustrating a flow of an example of an initial setting process.

FIG. 16 is a flowchart illustrating a flow of an example of an initial setting process. The initial setting process in step S1 in FIG. 15 includes, for example, the process illustrated in FIG. 16.

The control unit 25 stores $W_{11}$ to $W_{NN}$ received from the control device 26 in the storage unit 21a of the ΔE calculation unit 21 (step S20).

The control unit 25 sets initial values of $h_1$ to $h_N$ (for example, bias values) received from the control device 26 to the h updating circuits 21f1 to 21fN of the ΔE calculation unit 21 (step S21). The control unit 25 sets an initial value of the temperature parameter T to the selection circuit 22 based on an annealing condition received from the control device 26 (step S22).

The control unit 25 stores $x_1$ to $x_N$ (all zeros) in the storage unit 24a (step S23), and sets $g_1$ to $g_N$ to the holding units 21c1 to 21cN (step S24).

After then, the control unit 25 sets a variable g to g=1 (step S25). The control unit 25 uses a random number so as to select index=lg of one bit belonging to a group of $g_i$=g, updates $x_{lg}$ to 1 among $x_1$ to $x_N$, and stores $x_{lg}$ in the storage unit 24a (step S26).

The control unit 25 updates $h_1$ to $h_N$ according to the update of $x_{lg}$ (step S27). Since a change of $h_i$ (i=1 to N) when $x_{lg}$ changes from 0 to 1 is $+W_{lg,i}$, $h_i$ is updated to $h_i=h_i+W_{lg,i}$. The updated $h_1$ to $h_N$ are stored in a holding unit (not illustrated) in the h updating circuits 21f1 to 21fN.

After then, among the ΔE calculation circuits 21h1l to 21hN, the control unit 25 stores $W_{lg,j}$ (j is an index of a bit in a group of g) in a storage unit of a ΔE calculation circuit to which a local field value for a bit belonging to a group of $g_i$=g is supplied (step S28).

Next, the control unit 25 determines whether or not g=G is satisfied (step S29). In a case where g=G is satisfied, the control unit 25 completes the initial setting process, and in a case where g=G is not satisfied, the control unit 25 sets g=g+1 (step S30) and repeats the process from step S26.

In a case where the identification information calculation unit 23 uses the table 23b as illustrated in FIG. 12, the control unit 25 may create the table 23b by arranging index=lg obtained each time the process of step S26 is performed.

An order of the processes in the initial setting process is not limited to the above example, and the order may be changed as appropriate.

After the initial setting process described above is completed, the h propagation control unit 21g supplies $h_1$ to $h_N$ to the ΔE calculation circuits 21h1 to 21hN based on $x_1$ to $x_N$ and $g_1$ to $g_N$ (step S2). For example, in a case where a bit of index=i having a value of 1 and a bit of index=j having a value of 0 belong to the same group, the h propagation control unit 21g supplies $h_i$ output by the h updating circuit 21fi to the ΔE calculation circuit 21hi, and supplies $h_j$ to the ΔE calculation circuit 21hj.

After then, as described above, the ΔE calculation circuits 21h1 to 21hN calculates $ΔE_1$ to $ΔE_N$ (step S3). In the selection circuit 22 illustrated in FIG. 11, an offset value is added (step S4), and index=l is selected (step S5). The identification information calculation unit 23 outputs index=k and group index=$g_l$ according to the process described above (step S6). In a case where the identification information calculation unit 23 uses the table 23b as illustrated in FIG. 11, the identification information calculation unit 23 reads index=k from the table 23b, and then overwrites index=l in the same storage area.

After then, the updating unit 24 updates a value ($x_k$) of a bit of index=k stored in the storage unit 24a from 1 to 0, and the h updating circuits 21f1 to 21fN update $h_1$ to $h_N$ according to the update of $x_k$ (step S7).

The updating unit 24 updates a value ($x_l$) of a bit of index=l stored in the storage unit 24a from 0 to 1, and the h updating circuits 21f1 to 21fN update $h_1$ to $h_N$ according to the update of $x_l$. The ΔE calculation unit 21 updates a weighted value written in a storage unit of a ΔE calculation circuit to which a local field value for a bit belonging to a group of $g_l$ is supplied (step S8). For example, in a case where the identification information calculation unit 23 outputs index=l, the selection circuit 21bj illustrated in FIG. 4 outputs $W_{ij}$. In a case of $g_j=g_l$, this $W_{ij}$ is supplied to the ΔE calculation circuit 21hj. In a case where $W_{kj}$ is stored in the storage unit 21hja of the ΔE calculation circuit 21hj illustrated in FIG. 10, $W_{kj}$ is updated to $W_{ij}$.

After then, the control unit 25 determines whether or not the number of times the state updating process is performed reaches a predetermined number N1 (step S9). In a case where the number of update processes does not reach the predetermined number N1, the processes of steps S2 to S8 are repeated.

In a case where the number of update processes reaches the predetermined number N1, the control unit 25 determines whether or not the number of changes in T (the number of temperature changes) reaches a predetermined number N2 (step S10).

In a case where the number of temperature changes does not reach the predetermined number N2, the control unit 25 changes T (decreases the temperature) (step S11). A method of changing values of the predetermined numbers of times N1 and N2 and T (decreasing how many values at a time or the like) is determined based on an annealing condition. After the process of step S11, the processes from step S2 are repeated.

In a case where the number of temperature changes reaches the predetermined number N2, the control unit 25 obtains a value (a variable $x_i$ (i=1 to N)) of each bit at that time from the storage unit 24a, and transmits (outputs) the value as a solution (a calculation result) to the control device 26 (step S12). A display device may be coupled to the control unit 25. In this case, the control unit 25 may display the calculation result on the display device.

The updating unit 24 may update energy based on an energy change corresponding to index=k, l, and may hold minimum energy at each update time and a state (a state at the minimum energy) when the minimum energy is obtained. In this case, when the number of temperature changes reaches the predetermined number N2, the control unit 25 may obtain the state at the minimum energy held by the updating unit 14 and output the state as a solution.

An order of the processes described above is not limited to the above example, and the order may be changed as appropriate. For example, an order of the processes of steps S7 and S8 may be reversed.

The optimization device 20 according to the second embodiment as described above has the same advantage as that of the optimization device 10 according to the first embodiment.

Figure 17:
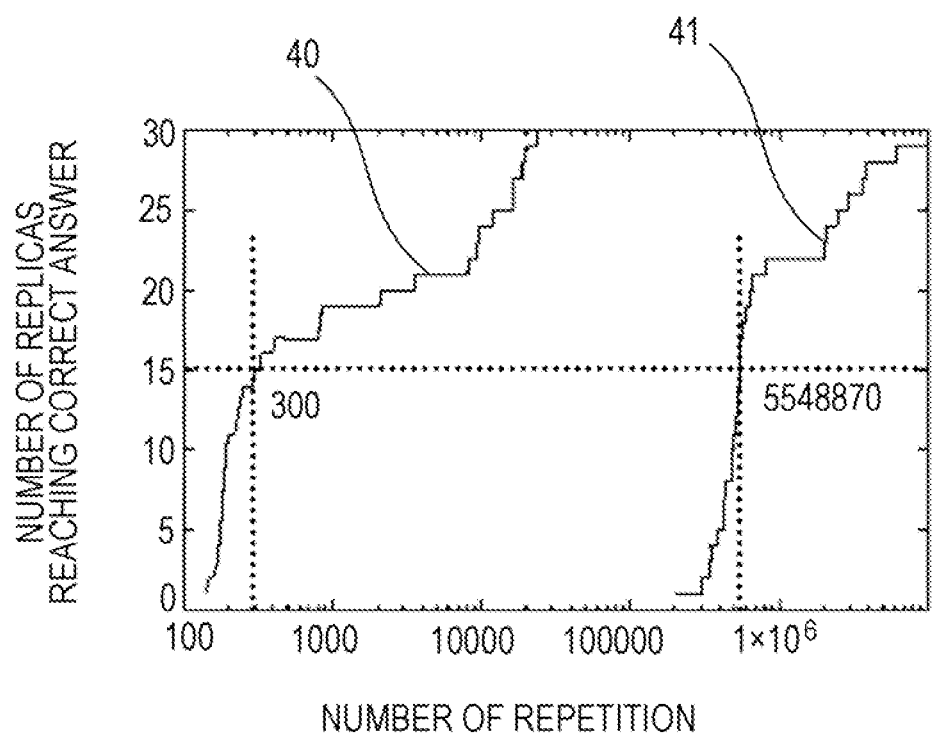
FIG. 17 is a diagram illustrating a simulation result representing a calculation shortening effect in a case where the optimization device of the second embodiment is used.

FIG. 17 is a diagram illustrating a simulation result representing a calculation shortening effect in a case where the optimization device of the second embodiment is used. The horizontal axis represents the number of times the state updating process is repeated, and the vertical axis represents the number of replicas (the number of optimization devices 20) which reach a correct answer.

A problem to be calculated is a traffic optimization problem with 32 cars and 32 routes (represented by the Ising model of 1024 bits). For comparison, FIG. 17 illustrates a simulation result 41 in a case of using an optimization device in the related art which minimizes energy by repeating transition of Hamming distance=1, together with a simulation result 40 in a case of using the optimization device 20 according to the second embodiment.

As illustrated in FIG. 17, in the optimization device 20 of the second embodiment, a convergence time of the solution is reduced by 1000 times or more compared to the optimization device in the related art. For example, in a case of the number of replicas reaching the correct answer=15, a speedup of 1830 times is obtained.

In the example of the traffic optimization problem described above, the number of bits of a weighted value may be reduced from 16 bits to 7 bits by being able to delete the 1-hot constraint terms of the second item on the right side illustrated in the equation (3). For this reason, the amount of hardware of the storage unit 21a which stores a weighted value may be reduced by 50% or more as compared with a case of having the 1-hot constraint term. Since a ratio of the storage unit 21a to the total amount of hardware of the optimization device 20 is large (80% or more in the optimization device in the related art), an effect of reducing the number of bits of the weighted value is large.

Modification Example

The optimization device 20 of the second embodiment performs the state transition between the states satisfying the 1-hot constraint, but may have a function of performing state transition of Hamming distance=1 as in the optimization device in the related art. In this case, in the optimization device 20, a configuration of performing the function of performing the state transition of Hamming distance=1 by disabling the function (hereinafter, referred to as the 1-hot constraint support function) of performing the state transition between the states satisfying the 1-hot constraint is added.

Figure 18:
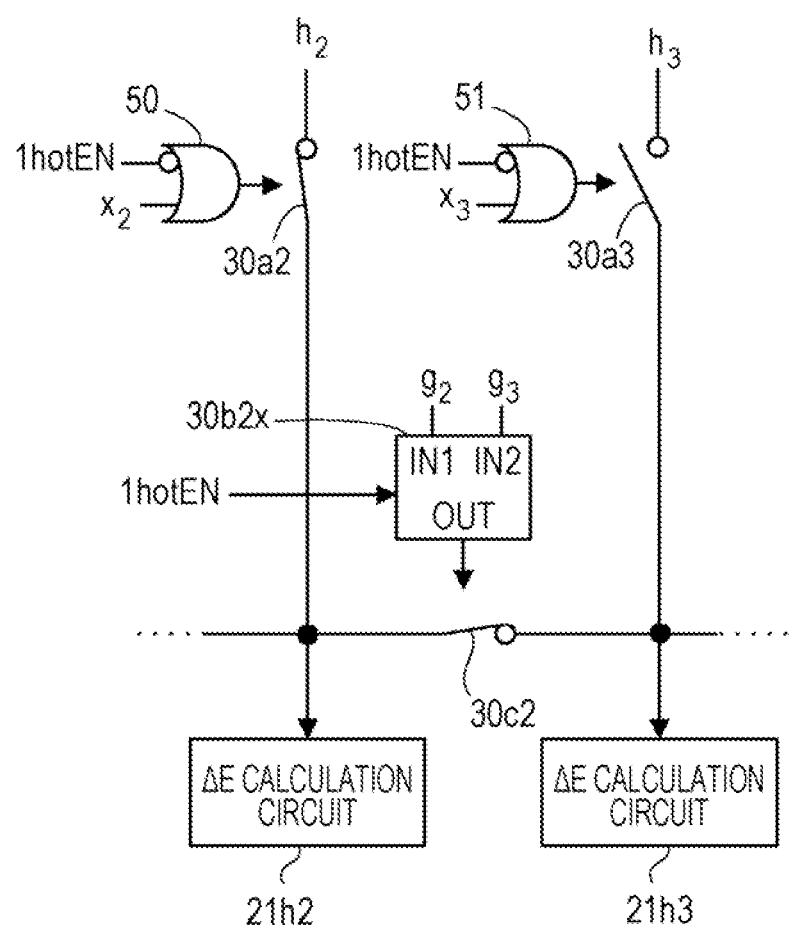
FIG. 18 is a diagram illustrating a first example of the h propagation control unit in the optimization device having a configuration for disabling a 1-hot constraint support function.

FIG. 18 is a diagram illustrating a first example of the h propagation control unit in the optimization device having a configuration for disabling the 1-hot constraint support function. In FIG. 18, the same elements as those illustrated in FIG. 6 are labeled with the same references.

FIG. 18 illustrates OR circuits 50 and 51 which generate control signals for the switches 30a2 and 30a3. A value (1 or 0) of 1hotEN is inverted (changed from 1 to 0 or 0 to 1) and input to one input terminal of the OR circuit 50. $x_2$ is input to the other input terminal of the OR circuit 50. A value of 1hotEN is inverted and input to one input terminal of the OR circuit 51, and $x_3$ is input to the other input terminal of the OR circuit 51.

1hotEN is an enable signal indicating whether or not to enable the 1-hot constraint support function. Hereinafter, in a case of 1hotEN=1, the above function is enabled, and in a case of 1hotEN=0, the above function is disabled and state transition of Hamming distance=1 is performed. For example, 1hotEN is output by the control unit 25 illustrated in FIG. 3.

The OR circuit 50 outputs $x_2$ as a control signal in a case of 1hotEN=1, and outputs 1 regardless of $x_2$ in a case of 1hotEN=0, thereby the switch 30a2 is turned on. The OR circuit 51 outputs $x_3$ as a control signal in a case of 1hotEN=1, and outputs 1 regardless of $x_3$ in a case of 1hotEN=0, thereby the switch 30a3 is turned on.

Among the switches 30a1 to 30aN illustrated in FIG. 6, control signals are supplied to the switches other than the switches 30a2 and 30a3 by the same OR circuit as the OR circuits 50 and 51 illustrated in FIG. 18.

FIG. 18 illustrates a control signal generation circuit 30b2x instead of the control signal generation circuit 30b2 illustrated in FIG. 6. To the control signal generation circuit 30b2x, $g_2$ and $g_3$ is input and 1hotEN is input. The control signal generation circuit 30b2x outputs 1 in a case of 1hotEN is 1 and $g_2=g_3$ and turns on the switch 30c2, and outputs 0 in a case where 1hotEN is 1 and $g_2 \neq g_3$ and turns off the switch 30c2. In a case of 1hotEN is 0, the control signal generation circuit 30b2x outputs 0 regardless of a relationship between $g_2$ and $g_3$ and turns off the switch 30c2.

Figure 19:
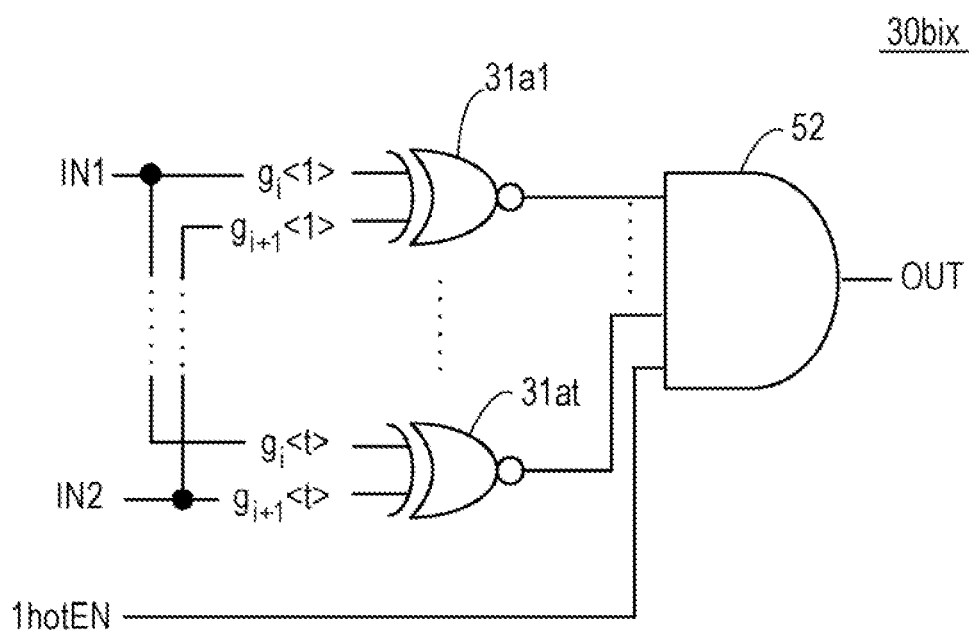
FIG. 19 is a diagram illustrating an example of the control signal generation circuit which generates a control signal based on 1hotEN.

FIG. 19 is a diagram illustrating an example of the control signal generation circuit which generates a control signal based on 1hotEN. In FIG. 19, the same elements as those illustrated in FIG. 7 are labeled with the same references.

Unlike the AND circuit 31b of the control signal generation circuit 30bi illustrated in FIG. 7, an AND circuit 52 of the control signal generation circuit 30bix illustrated in FIG. 19 receives outputs of the ExNOR circuits 31a1 to 31at and receives 1hotEN. For this reason, in a case of 1hotEN=0, the AND circuit 52 outputs 0 regardless of the outputs of the ExNOR circuits 31a1 to 31at.

A control signal is supplied to each of the switches 30c1 to 30cN(N−1) illustrated in FIG. 6 by the control signal generation circuit 30bix as illustrated in FIG. 19.

Figure 20:
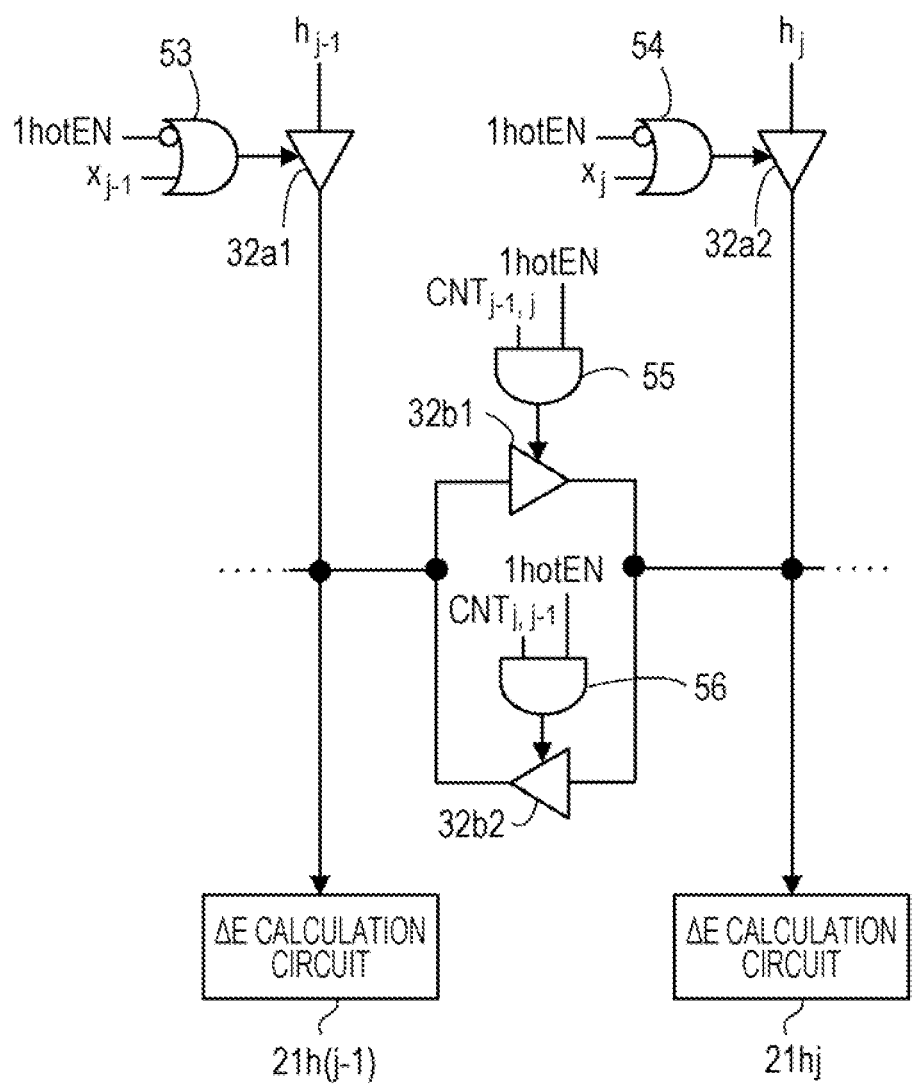
FIG. 20 is a diagram illustrating a second example of the h propagation control unit in the optimization device having a configuration for disabling the 1-hot constraint support function.

FIG. 20 is a diagram illustrating a second example of the h propagation control unit in the optimization device having a configuration for disabling the 1-hot constraint support function. In FIG. 20, the same elements as those illustrated in FIG. 8 are labeled with the same references.

FIG. 20 illustrates OR circuits 53 and 54 which generates control signals for the tri-state buffers 32a1 and 32a2, and AND circuits 55 and 56 which generates control signals for the tri-state buffers 32b1 and 32b2.

A value of 1hotEN is inverted and input to one input terminal of the OR circuit 53. $x_{j-1}$ is input to the other input terminal of the OR circuit 53. A value of 1hotEN is inverted and input to one input terminal of the OR circuit 54, and $x_j$ is input to the other input terminal of the OR circuit 54.

The OR circuit 53 outputs $x_{j-1}$ as a control signal in a case of 1hotEN=1, and outputs 1 regardless of $x_{j-1}$ in a case of 1hotEN=0. When the output of the OR circuit 53 is 1, the tri-state buffer 32a1 outputs $h_{j-1}$. When the output of the OR circuit 53 is 0, the output terminal of the tri-state buffer 32a1 is in a high impedance state. The OR circuit 54 outputs $x_j$ as a control signal in a case of 1hotEN=1, and outputs 1 regardless of $x_j$ in a case of 1hotEN=0. When the output of the OR circuit 54 is 1, the tri-state buffer 32a2 outputs $h_j$. When the output of the OR circuit 54 is 0, the output terminal of the tri-state buffer 32a2 is in a high impedance state.

Control signals are also supplied to the tri-state buffers 32a3 and 32a4 illustrated in FIG. 8 by the same OR circuit as the OR circuits 53 and 54 illustrated in FIG. 20.

1hotEN is input to one input terminal of the AND circuit 55, and the control signal $CNT_{j-1,j}$ is input to the other input terminal. 1hotEN is input to one input terminal of the AND circuit 56, and the control signal $CNT_{j,j-1}$ is input to the other input terminal.

The AND circuit 55 outputs the control signal $CNT_{j-1,j}$ in a case of 1hotEN=1, and outputs 0 regardless of the control signal $CNT_{j-1,j}$ in a case of 1hotEN=0. When the output of the AND circuit 55 is 1, the tri-state buffer 32b1 outputs an input signal from the output terminal. When the output of the AND circuit 55 is 0, the output terminal of the tri-state buffer 32b1 is in a high impedance state. The AND circuit 56 outputs the control signal $CNT_{j,j-1}$ in a case of 1hotEN=1, and outputs 0 regardless of the control signal $CNT_{j,j-1}$ in a case of 1hotEN=0. When the output of the AND circuit 56 is 1, the tri-state buffer 32b2 outputs an input signal from the output terminal. When the output of the AND circuit 56 is 0, the output terminal of the tri-state buffer 32b2 is in a high impedance state.

Control signals are also supplied to the tri-state buffers 32b3 and 32b4 illustrated in FIG. 8 by the same AND circuit as the AND circuits 55 and 56 illustrated in FIG. 20.

By adding the above elements to the h propagation control unit 21g or the h propagation control unit 21ga, in the case of 1hotEN=0, one corresponding local field value is supplied to each of the ΔE calculation circuits 21h1 to 21hN. For example, $h_j$ is supplied to the ΔE calculation circuit 21hj, and $h_i$ is not supplied.

Figure 21:
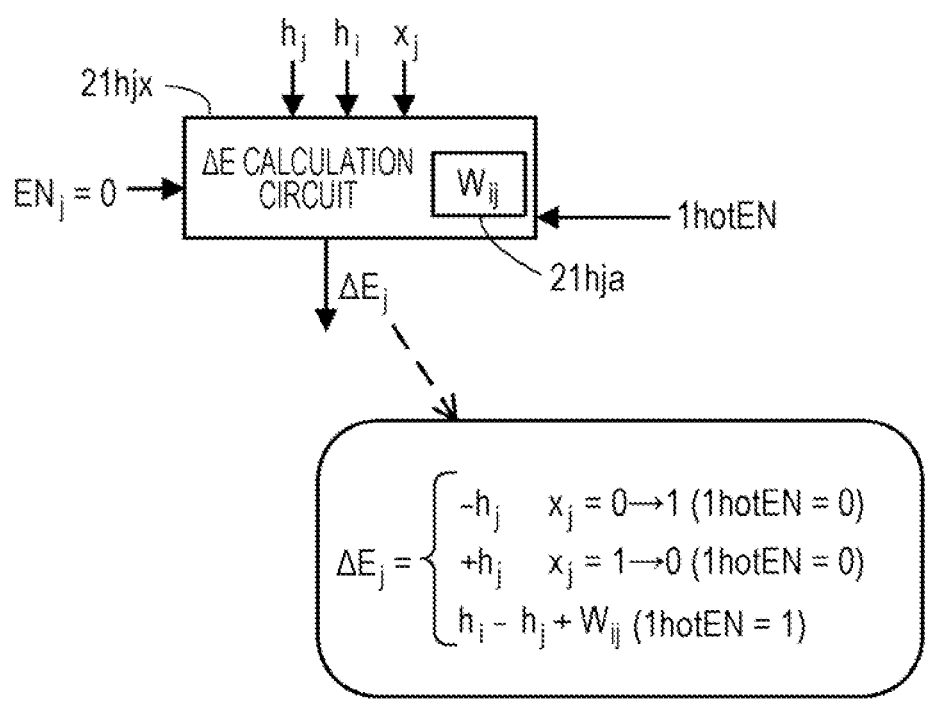
FIG. 21 is a diagram illustrating an example of the ΔE calculation circuit in the optimization device having a configuration for disabling the 1-hot constraint support function.

FIG. 21 is a diagram illustrating an example of the ΔE calculation circuit in the optimization device having a configuration for disabling the 1-hot constraint support function.

The ΔE calculation circuit 21hjx corresponds to the ΔE calculation circuit 21hj illustrated in FIG. 10. Unlike the ΔE calculation circuit 21hj, 1hotEN and $x_j$ are supplied to the ΔE calculation circuit 21hjx. In a case of 1hotEN=0, $h_i$ is not supplied out of $h_j$ and $h_i$.

In a case of 1hotEN=0, such a ΔE calculation circuit 21hjx calculates $\Delta E_j$ by $x_j$ being changed. The ΔE calculation circuit 21hjx outputs $\Delta E_j=-h_j$ in a case where $x_j$ changes from 0 to 1 (in a case where current $x_j$ is 0), and outputs $\Delta E_j=+h_j$ in a case where $x_j$ changes from 1 to 0 (in a case where current $x_j$ is 1). In a case of 1hotEN=1, the ΔE calculation circuit 21hjx outputs $\Delta E_j=h_i-h_j+W_{ij}$.

Each of the ΔE calculation circuits 21h1 to 21hN illustrated in FIG. 4 has the configuration as illustrated in FIG. 21.

Figure 22:
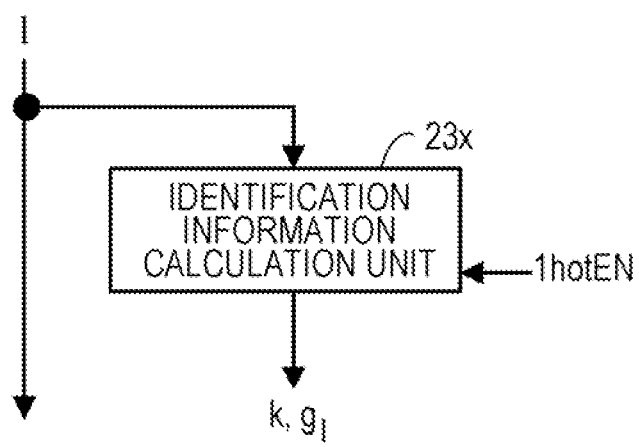
FIG. 22 is a diagram illustrating an example of the identification information calculation unit in the optimization device having a configuration for disabling the 1-hot constraint support function.

FIG. 22 is a diagram illustrating an example of the identification information calculation unit in the optimization device having a configuration for disabling the 1-hot constraint support function.

Unlike the identification information calculation unit 23 illustrated in FIG. 3, the identification information calculation unit 23x receives 1hotEN. The identification information calculation unit 23x outputs index=k and group index=$g_l$ based on index=l in a case of 1hotEN=1, and outputs 0 as index=k and group index=$g_l$ in a case of 1hotEN=0, for example.

index=l output from the selection circuit 22 is supplied to the ΔE calculation unit 21 and the updating unit 24 regardless of a value of 1hotEN.

Since the identification information calculation unit 23x outputs, for example, 0 as group index=$g_l$ in a case of 1hotEN=0, the matching detection units 21d1 to 21dN in FIG. 4 consistently output 0. For this reason, the switches 21e1 to 21eN are consistently in an off state, and a weighted value is not stored in the storage units 21h1a to 21hNa of the ΔE calculation circuits 21h1 to 21hN. In a case of 1hotEN=0, $g_l$ output by the identification information calculation unit 23x may not be 0, and may be a value other than 1 to G.

By performing the above-described modification on the optimization device 20 of the second embodiment described above, it is possible to execute a function of performing state transition of Hamming distance=1 by disabling the 1-hot constraint support function according to the problem to be calculated.

In a case where the 1-hot constraint support function is disabled, each of $\Delta E_1$ to $\Delta E_N$ supplied to the selection circuit 22 represents an energy change due to one of N bits being changed. Based on a magnitude relationship between the thermal excitation energy and $\Delta E_1$ to $\Delta E_N$ described above, the selection circuit 22 outputs an index which identifies one bit permitted to be updated among N bits. The updating unit 24 updates a value of the bit identified by the index.

Meanwhile, in the above description, for example, as illustrated in FIG. 13, the bit identified by the smaller index belongs to the group of the smaller group index, but this is not limited thereto. For example, a sequence of bits arranged in the order of small index first may be shuffled within a group or between groups.

Figure 23:
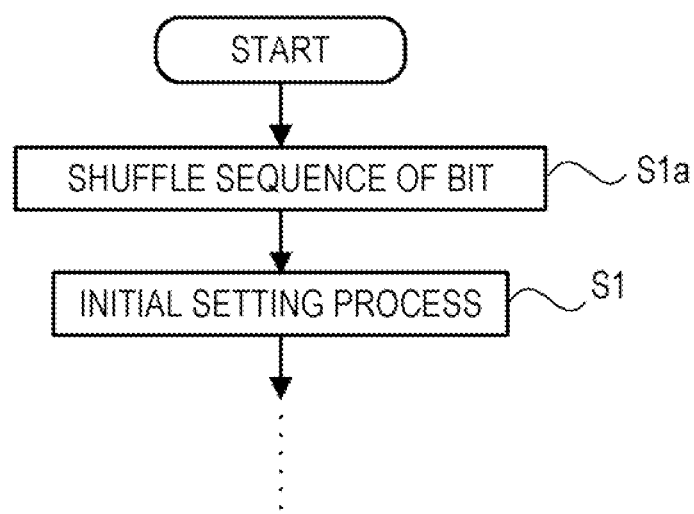
FIG. 23 is a flowchart illustrating a flow of a process of an example of the optimization device including a shuffling process.

FIG. 23 is a flowchart illustrating a flow of a process of an example of the optimization device including a shuffling process.

The control unit 25 performs a process (step S1a) of shuffling the sequence of the bits, for example, before the initial setting process illustrated in FIG. 15. This is because in a case where the sequence of the bits is shuffled, a weighted value sequence stored in the storage unit 21a is also shuffled accordingly.

As described above, one aspect of an optimization device and a control method of the optimization device of the embodiment has been described in accordance with the embodiment, such aspect is a mere example and not limited to the above description.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. An optimization device comprising:
a plurality of calculation circuits configured to respectively calculate, for a plurality of bits corresponding to a plurality of spins included in an Ising model obtained by converting a problem to be calculated, a first energy change of the Ising model due to a value of a first bit having the value of 1 being changed from 1 to 0 and a value of a second bit having the value of 0 being changed from 0 to 1, among a plurality of bits included in each of a plurality of groups in a case where the plurality of bits are divided into the plurality of groups, based on a first local field value for the first bit, a second local field value for the second bit, and a weighted value, held in a storage, indicating a magnitude of interaction between the first bit and the second bit;

a selection circuit configured to output first bit identification information identifying one second bit having a value permitted to be updated from 0 to 1, among the second bits included in each of the plurality of groups, based on a magnitude relationship between thermal excitation energy, determined based on an input temperature parameter and a random number, and the first energy change output by each of the plurality of calculation circuits;

an identification information calculation circuit configured to detect a first group to which the second bit permitted to be updated belongs and output second bit identification information identifying the first bit which belongs to the first group, based on the first bit identification information output by the selection circuit; and an updating circuit configured to update a value of the first bit which belongs to the first group from 1 to 0 based on the second bit identification information, and update a value of the second bit permitted to be updated from 0 to 1 based on the first bit identification information, wherein an initial setting is performed on each of the plurality of groups so that one of the plurality of bits is set as the first bit having a value of 1 and other bits except for the first bit of the plurality of bits are set as the second bit having a value of 0.

2. The optimization device according to claim 1, further comprising:

a propagation control circuit configured to propagate the first local field value for the first bit which belongs to the same group as that of the second bit, to a first calculation circuit to which the second local field value for the second bit is supplied, among the plurality of calculation circuits, based on group identification information identifying a group to which each of the plurality of bits belongs and values of the plurality of bits.

3. The optimization device according to claim 1, wherein the identification information calculation circuit outputs group identification information identifying the first group, and the optimization device further comprises a circuit configured to supply a weighted value indicating a magnitude of the interaction between the first bit and the second bit which belong to the first group to the storage, based on the group identification information.

4. The optimization device according to claim 1, wherein in a case where only the first local field value out of the first local field value and the second local field value is supplied to a second calculation circuit among the plurality of calculation circuits, the second calculation circuit outputs a predetermined positive value instead of calculating the first energy change.

5. The optimization device according to claim 1, wherein each of the plurality of calculation circuits receives an enable signal, and calculates the first energy change in a case where the enable signal is a first value and calculates a second energy change of the Ising model when one of the plurality of bits is changed in a case where the enable signal is a second value, the selection circuit outputs third bit identification information identifying one third bit permitted to be updated among the plurality of bits, based on a magnitude relationship between the thermal excitation energy and the second energy change output by each of the plurality of calculation circuits, and the updating circuit updates a value of the third bit based on the third bit identification information.

6. A control method of an optimization device comprising:

calculating, using a plurality of calculation circuits, for a plurality of bits corresponding to a plurality of spins included in an Ising model obtained by converting a problem to be calculated, a first energy change of the Ising model due to a value of a first bit having the value of 1 being changed from 1 to 0 and a value of a second bit having the value of 0 being changed from 0 to 1, among a plurality of bits included in each of a plurality of groups in a case where the plurality of bits are divided into the plurality of groups, based on a first local field value for the first bit, a second local field value for the second bit, and a weighted value, held in a storage, indicating a magnitude of interaction between the first bit and the second bit;

outputting, using a selection circuit, first bit identification information identifying one second bit having a value permitted to be updated from 0 to 1, among the second bits included in each of the plurality of groups, based on a magnitude relationship between thermal excitation energy, determined based on an input temperature parameter and a random number, and the first energy change output by each of the plurality of calculation circuits;

detecting, using an identification information calculation circuit, a first group to which the second bit permitted to be updated belongs and output second bit identification information identifying the first bit which belongs to the first group, based on the first bit identification information output by the selection circuit; and updating, using an updating circuit, a value of the first bit which belongs to the first group from 1 to 0 based on the second bit identification information, and update a value of the second bit permitted to be updated from 0 to 1 based on the first bit identification information, wherein an initial setting is performed on each of the plurality of groups so that one of the plurality of bits is set as the first bit having a value of 1 and other bits except for the first bit of the plurality of bits are set as the second bit having a value of 0.

7. The control method according to claim 6 further comprising:

performing, using a control circuit, an initial setting on each of the plurality of groups so that one of the plurality of bits is set as the first bit having a value of 1 and other bits except for the first bit of the plurality of bits are set as the second bit having a value of 0.

8. A neural network comprising:

a plurality of calculation circuits configured to respectively calculate, for a plurality of bits corresponding to a plurality of spins included in an Ising model obtained by converting a problem to be calculated, a first energy change of the Ising model due to a value of a first bit having the value of 1 being changed from 1 to 0 and a value of a second bit having the value of 0 being changed from 0 to 1, among a plurality of bits included in each of a plurality of groups in a case where the plurality of bits are divided into the plurality of groups, based on a first local field value for the first bit, a second local field value for the second bit, and a weighted value, held in a storage, indicating a magnitude of interaction between the first bit and the second bit;

a selection circuit configured to output first bit identification information identifying one second bit having a value permitted to be updated from 0 to 1, among the second bits included in each of the plurality of groups, based on a magnitude relationship between thermal excitation energy, determined based on an input temperature parameter and a random number, and the first energy change output by each of the plurality of calculation circuits;

an identification information calculation circuit configured to detect a first group to which the second bit permitted to be updated belongs and output second bit identification information identifying the first bit which belongs to the first group, based on the first bit identification information output by the selection circuit; and an updating circuit configured to update a value of the first bit which belongs to the first group from 1 to 0 based on the second bit identification information, and update a value of the second bit permitted to be updated from 0 to 1 based on the first bit identification information, wherein an initial setting is performed on each of the plurality of groups so that one of the plurality of bits is set as the first bit having a value of 1 and other bits except for the first bit of the plurality of bits are set as the second bit having a value of 0.

9. The neural network according to claim 8, wherein the plurality of calculation circuits calculate an energy change caused by state transition of Hamming distance=2.

* * * * *